US005225134A

United States Patent [19]

Nasvik et al.

[11] Patent Number: 5,225,134

[45] Date of Patent: Jul. 6, 1993

[54] METHODS OF FORMING CONTOURED WALLS

[75] Inventors: Peter A. Nasvik, West St. Paul, Minn.; Paul C. Nasvik, Hudson, Wis.

[73] Assignee: Concrete Design Specialties, Inc., St. Paul, Minn.

[21] Appl. No.: 652,886

[22] Filed: Feb. 8, 1991

[51] Int. Cl.[5] .......................... B28B 1/16; B28B 7/36; B29C 39/12; E04B 1/16

[52] U.S. Cl. ...................................... 264/219; 249/16; 249/35; 249/55; 249/99; 249/102; 249/104; 249/112; 249/140; 264/31; 264/33; 264/34; 264/35; 264/225; 264/245; 264/254; 264/255; 264/256; 264/259; 264/316; 264/338

[58] Field of Search .................................. 264/31-35, 264/245, 255, 219, 225, 313, 316, 338; 249/16, 55, 99, 102, 104, 112, 140, 35

[56] References Cited

U.S. PATENT DOCUMENTS

| | | | |
|---|---|---|---|
| Re. 29,945 | 3/1979 | Scott . | |
| 787,665 | 4/1905 | Deeds et al. . | |
| 1,491,205 | 4/1924 | Ford . | |
| 1,636,396 | 7/1927 | Urschel | 249/39 |
| 1,712,678 | 5/1929 | Redman | 249/16 |
| 1,776,999 | 9/1930 | Jensen . | |
| 1,937,306 | 11/1933 | Barriball . | |
| 2,474,654 | 6/1949 | Carlson | 264/256 X |
| 2,513,648 | 7/1950 | Iezzi . | |
| 2,616,145 | 11/1952 | Dufford . | |
| 2,629,135 | 2/1953 | Johnson | 249/140 |
| 2,689,381 | 9/1954 | Terriere | 249/140 |
| 3,002,322 | 10/1961 | Dorsett | 249/16 X |
| 3,177,279 | 4/1965 | Bilodeau | 264/255 |
| 3,307,822 | 3/1967 | Stout . | |
| 3,344,570 | 10/1967 | Marson . | |
| 3,566,572 | 3/1971 | Wilkinson | 264/35 X |
| 3,584,826 | 6/1971 | Liester | 249/35 |
| 3,950,477 | 4/1976 | Di Giacomo | 264/35 X |
| 3,954,377 | 5/1976 | Scholz et al. | 249/112 X |
| 4,116,415 | 9/1978 | Ward . | |
| 4,131,406 | 12/1978 | Fresquez | 404/93 X |
| 4,135,840 | 1/1979 | Puccini et al. | 404/93 |
| 4,150,808 | 4/1979 | Sawyer . | |
| 4,159,097 | 6/1979 | Strickland . | |
| 4,407,480 | 10/1983 | Trimmer et al. . | |
| 4,555,088 | 11/1985 | Chang . | |

FOREIGN PATENT DOCUMENTS

| | | | |
|---|---|---|---|
| 450070 | 7/1948 | Canada | 249/140 |
| 1101365 | 10/1955 | France | 249/16 |
| 158825 | 9/1984 | Japan | 249/16 |
| 214662 | 8/1989 | Japan | 249/16 |

OTHER PUBLICATIONS

A Reinforced Earth brochure, entitled "Family of Construction Technologies", 8 pages, copyright 1990, labelled Exhibit A.

A Reinforced Earth brochure, entitled "An Advanced Construction Technology", 8 pages, copyright 1990, labelled Exhibit B.

(List continued on next page.)

*Primary Examiner*—Karen Aftergut

*Attorney, Agent, or Firm*—Merchant, Gould, Smith, Edell, Welter & Schmidt

[57] ABSTRACT

The present invention is a contoured wall and method for creating the contour and appearance of a wall formed from individual assembled units such as stones. The wall is formed from a plurality of mating form liners each having a reciprocal contoured surface to that of the desired stone wall. The wall is formed from hardenable construction material such as concrete poured between two mold members with the form liners attached to at least one of the mold members. Each of the form liners has a lateral relief mold face adapted to provide a molded surface having the contour of a stone wall. Each lateral relief mold face of the form liners has a latticework non-linear mortar-forming interlocking portion surrounding stone-forming recessed portions. The form liners ar positionable in a plurality of arrangements wherein the interlocking portions and recessed portions along the mating edge of each form liner mate along the mating edge of the adjacent form liner to form a continuous lateral relief mold face.

16 Claims, 16 Drawing Sheets

OTHER PUBLICATIONS

Article entitled "Concrete Form Construction", pp. 47–76, labelled Exhibit AA.

Brochure entitled "Custom Rock Creations", dated May 1988, 4 pages, labelled Exhibit BB.

Bomanite® Corporation brochure entitled "The Network For Concrete Innovation", 4 pp., dated 1989, labelled Exhibit A.

Bomanite® Corporation brochure entitled, "Bomacron® Patterns", Bomanite Patterns, and Bomanite Guideline Specification, 4 pp. dated 1989, labelled Exh. B.

METHODS OF FORMING CONTOURED WALLS

FIELD OF THE INVENTION

The present invention relates generally to walls made from hardenable construction materials, such as concrete, having at least one contoured face. In particular, the present invention relates to concrete form liners for use in forming concrete walls contoured to have the appearance of a stone wall.

BACKGROUND OF THE INVENTION

In the past, walls have been constructed from individual units such as stones, rocks, blocks, or bricks which are assembled into the shape of a wall and held together with a bonding substance, such as mortar.

One problem with a wall of this type is that they are typically expensive and time consuming to construct. One alternative type of wall involves constructing a wall from hardenable construction material, such as poured concrete. Concrete walls of this type may be constructed so that the face of the wall is substantially smooth. A concrete wall may also be textured, thereby having the appearance of a wall formed from a plurality of individual assembled units, such as bricks. U.S. Pat. No. 3,307,822 (the '822 patent) illustrates one example of constructing a vertical wall from concrete creating the appearance of a wall formed from individual bricks. The '822 patent also illustrates a technique of providing a vertical concrete wall with a contoured surface by pouring the concrete wall between mold members that leave behind a contour one one or more of the lateral faces of the wall once the concrete hardens.

Additional techniques are known in the construction industry for creating concrete surfaces with textures and patterns. In the past, horizontal concrete surfaces such as roads, sidewalks, and floors, have been provided with textured surfaces, for example, by stamping a contour into the concrete before it hardens. Vertical concrete walls have also been provided with textured surfaces by adding a desired texture to a surface through veneering, wherein another material is adhered to the exterior surface of the concrete wall.

Several problems arise when trying to simulate natural rock of randomly sized and/or shaped units, intended to resemble a natural stone wall. When it is desired to have a natural looking concrete wall that appears to be formed from a plurality of non-linear and/or non-uniform units, the concrete wall may not appear natural if a repeating pattern is easily visible. Such a problem does not exist in forming a brick wall where all bricks have the same dimensions. The ability to easily and inexpensively create the appearance of a non-repeating pattern in a stone wall has been a significant concern in the construction industry.

Another problem arises in the ability to easily provide mold members that are usable in a variety of different applications to create a concrete wall having the contour of a wall formed from individual units. For example, in some construction applications, the base of the wall may not be a uniform elevation if the base of the wall follows the contours of the ground with varying elevations. In other construction applications, walls of varying heights may be required. To provide contoured mold members having customized sizes to accommodate different construction applications often significantly increases construction costs.

It is clear that a long and unfilled need has existed in the art for a system for more easily and inexpensively forming walls with one or more contoured faces that resemble individual assembled building units. In addition, there is a need for a system for use in more easily and inexpensively creating concrete walls in a variety of construction applications with one or more faces that more naturally resemble walls formed from individual non-linear and/or non-uniform building units, such as stones. The present invention solves these and other problems associated with the prior art.

SUMMARY OF THE INVENTION

The present invention relates to a form liner adapted for use in forming a wall having a natural stone wall contour. The form liner includes a lateral relief mold face having a plurality of recessed portions. Each recessed portion is adapted to form a stone-like surface having the contour of a natural stone. The lateral relief mold face also includes a non-linear latticework interlocking portion. The interlocking portion is adapted to form the mortar-like surface that lies between the stone-like surfaces. The form liner also includes a mating edge surrounding the perimeter of the lateral relief mold face. The interlocking portion surrounds the perimeters of each of the recessed portions except where a recessed portion contacts the mating edge. Thus, where a recessed portion contacts the mating edge, a portion of its perimeter is the interlocking portion and the remainder is the mating edge. The interlocking portion engages the mating edge at a plurality of mating alignment points. The mating alignment points are spaced equidistant along the mating edge with the distance between any two adjacent mating alignment points equal to a mating alignment unit.

The form liner of the present invention is matable with at least one other form liner to form a gang form liner for use in forming a plurality of sections of wall simultaneously. The gang form liner comprises a plurality of form liners mated along mating edges. When the form liners mate along mating edges, mating alignment points from adjacent liners align to form an aligned mortar-forming interlocking portion. The aligned mortar forming interlocking portion surrounds at least one of the recessed portions on each of the liners to form a combined stone-forming recessed portion along the mating edges that is adapted to form the stone-like surface on the wall. In the preferred embodiment, the form liners of the present invention are matable in a plurality of arrangements. For example, the mating edges of at least two liners are matable in a plurality of arrangements to form a plurality of different gang form liners.

The form liners preferably have mating edges that are rectangular with a pair of lateral edge portions and a pair of end edge portions. The form liners might typically include mating alignment units of about 4 to 40 inches, preferably about 8 to 16 inches, and more preferably about 12 inches, with the lateral edge portions including 5 to 20 mating alignment units, preferably 6 to 10, and more preferably 8 mating alignment units; and the end edge portions including a plurality of mating alignment units, preferably 2 to 3, and more preferably 2 mating units. Preferably, the interlocking portion of the form liners each have a non-symmetrical pattern. In some construction applications, liners having different patterns to the interlocking portions may be provided. In other applications, liners with substantially identical patterns may be used. Further, liners with identical and different patterns may be provided.

In the preferred embodiment, two form liners are matable between the lateral edge portions of each form liner, between the end edge portions of each form liner, and between one of the lateral edge portions of one of the form liners and one of the end edge portions of one of another form liner. A third form liner may be provided having a mating edge wherein the third form liner is matable along the mating edge to at least one of the mating edges of said first and second form liners. Any number of additional number of form liners may also be provided to mate with the other liners.

The present invention also relates to a method of forming a wall having a natural stone wall contour. Using the form liners of the present invention, preferably at least two form liners are mated along the mating edges to form a gang form liner. A mold member is provided and the gang form liner and mold member are secured to create an enclosed molding cavity between the gang form liner and the mold member wherein the lateral relief mold face of each form liner faces toward a portion of the mold member with the gang form liner and the mold member spaced apart at the distance equal to the desired thickness of the wall. The molding cavity is filled with a hardenable construction material and allowed to set. The gang form liner and the mold member are removed from the set construction material to provide a wall portion having at least one lateral face having a contour of a stone wall molded from the lateral relief mold faces of the form liners of the gang form liner. Of course, a wall could be formed using a single form liner of the invention, molding each section of the wall individually.

The method preferably further comprises the steps of rearranging the form liners after forming a wall portion and mating the form liners in a second arrangement to form a second gang form liner having a different pattern to the gang liner used to form the first wall portion. Possible rearrangements of the form liners of the first gang form liner to form the second form liner when one of the lateral edge portions of a first liner is mated with one of the lateral edge portions of the second liner in the first gang form liner include: (1) sliding one or both of the first and second form liners along the mated lateral edge portions of said first liner and said second liner; (2) mating one of the end edge portions of the first liner with one of the lateral edge portions of the second liner; (3) mating the lateral edge portion of the first liner with the other lateral edge portion of the second liner; (4) mating the other lateral edge portion of the first liner with the other lateral edge portion of the second liner; and (5) mating one of the end edge portions of the first liner with one of the end edge portions of the second liner.

BRIEF DESCRIPTION OF THE DRAWINGS

In the drawings, wherein like reference numerals generally indicate corresponding parts throughout the several views.

DETAILED DESCRIPTION OF THE PREFERRED EMBODIMENTS

Figure 1:
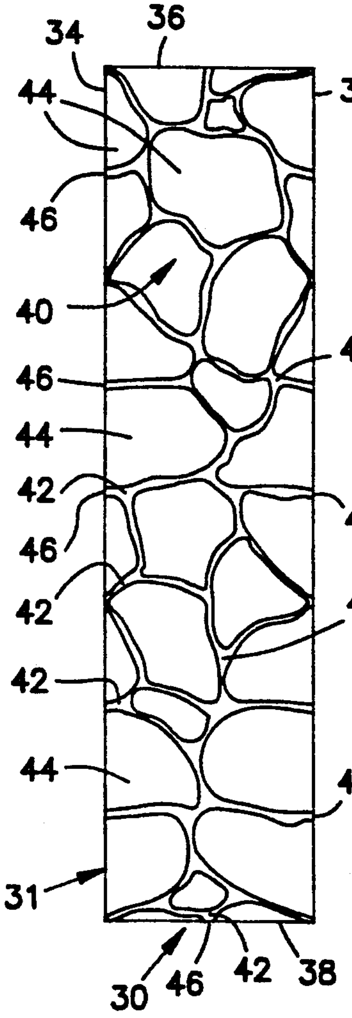
FIG. 1 is a front view of a first preferred embodiment of a form liner according to the principles of the present invention.
Figure 2:
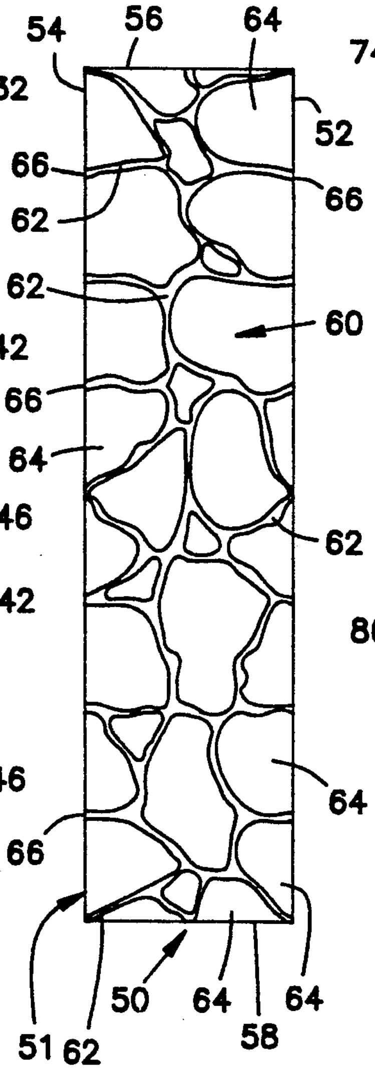
FIG. 2 is a front view of a second preferred embodiment of a form liner according to the principles of the present invention.
Figure 3:
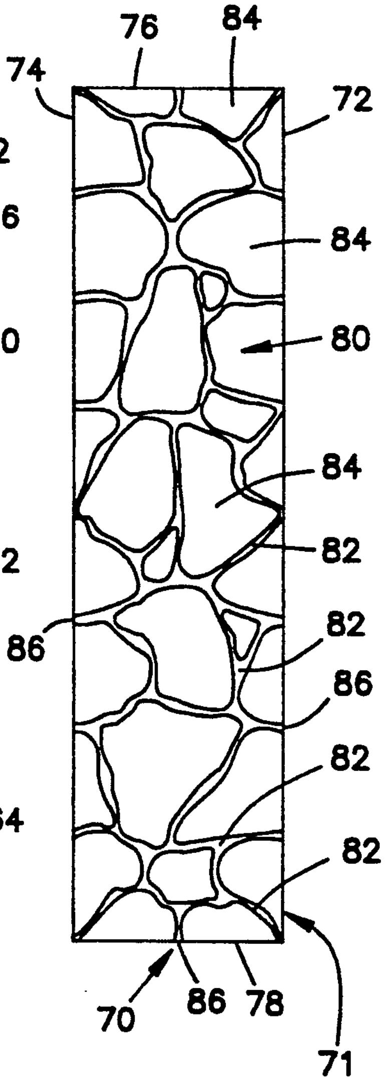
FIG. 3 is a front view of a third preferred embodiment of a form liner according to the principles of the present invention.

Referring now to FIGS. 1-3, preferred embodiments of a first form liner, or first liner 30, a second form liner, or second liner 50, and a third form liner, or third liner 70, are shown according to the principles of the present invention. The form liners are used to form a contoured surface on a wall formed from a hardenable construction material that sets or dries to form a rigid structure. Preferably, the hardenable construction material includes cement. In the preferred embodiment, the construction material is concrete containing cement, sand, and gravel.

The first liner 30 shown in FIG. 1 has a lateral relief mold face 40 adapted to provide a molded surface having the contour of a stone wall. The lateral relief mold face 40 is comprised of a latticework interlocking portion 42 adapted to form mortar-like portions of the resulting wall. In the preferred embodiment, the interlocking portion 42 is non-linear and irregular and varies in width. Curved segments and/or linear segments intersecting at non-right angles are typically present to give the appearance of the mortar surrounding a plurality of natural stones of different sizes and shapes. While the preferred embodiment includes an irregular and non-linear interlocking portion defining the stone perimeters, there may be some linear portions or segments present, some of which may intersect at right angles, which define a portion of the perimeter of a natural looking stone wall. In some stone walls, linear interlocking portions with generally uniform widths but non-uniform lengths may be provided. A plurality of recessed portions 44 are provided on the lateral relief mold face 40. The recessed portions 44 are at least partially surrounded by the interlocking portion 42. The recessed portions 44 are adapted to form the stone-like surfaces having the contour of natural stone, to give the resulting wall a natural stone wall appearance.

Second liner 50 and third liner 70 each are provided with a lateral relief mold face 60 and 80, respectively. Like the lateral relief mold face of first liner 30, the lateral relief mold face 60 of second liner 50 and the lateral relief mold face 80 of third liner 70 are both adapted to provide a molded surface having the contour of a stone wall. Each of the lateral relief mold faces include latticework interlocking portions 62, 82, preferably non-linear, and recessed portions 64, 84.

In the preferred embodiments illustrated, the resulting stone wall formed by each of the first liner 30, second liner 50, and third liner 70 have different stone patterns. While three different stone patterns having similar textures are illustrated in the FIGS. 1-3, other variations are possible to produce walls with other desired textures and patterns.

Each of the form liners, 30, 50, 70 is capable of forming a single section of wall having the contour of a stone wall. As will be more fully described below, in many construction applications, the form liners are joined together to simultaneously form several sections of a concrete wall. When several form liners are joined together the resulting form liner is sometimes called a gang form liner. To form a gang form liner, at least two liners are brought together in abutting, or mating, relationship along two mating edges, one on each liner, to present a continuous lateral relief mold face. It is to be appreciated that each of the form liners of the present invention could be used individually, rather than as part of a gang form liner, to form successive sections of the wall in some construction applications.

Referring again to FIG. 1, first form liner 30 includes a mating edge 31 comprising two lateral edge portions and two end edge portions. The mating edge 31 includes first mating edge 32 and second mating edge 34 which are the lateral edge portions, and a third mating edge 36, and a fourth mating edge 38, which are end edge portions. In FIG. 2, second liner 50 includes a mating edge 51 comprising a first mating edge 52, a second mating edge 54, a third mating edge 56, and a fourth mating edge 58. Likewise, third line 70, shown in FIG. 3, includes a mating edge 71 comprising a first mating edge 72, a second mating edge 74, a third mating edge 76, and a fourth mating edge 78. In the preferred embodiment, the mating edges of each form liner are linear and the outer perimeter of each form liner is rectangular. However, it is to be appreciated that the mating edges may be non-linear and the resulting perimeters may be non-rectangular as well.

Figure 6:
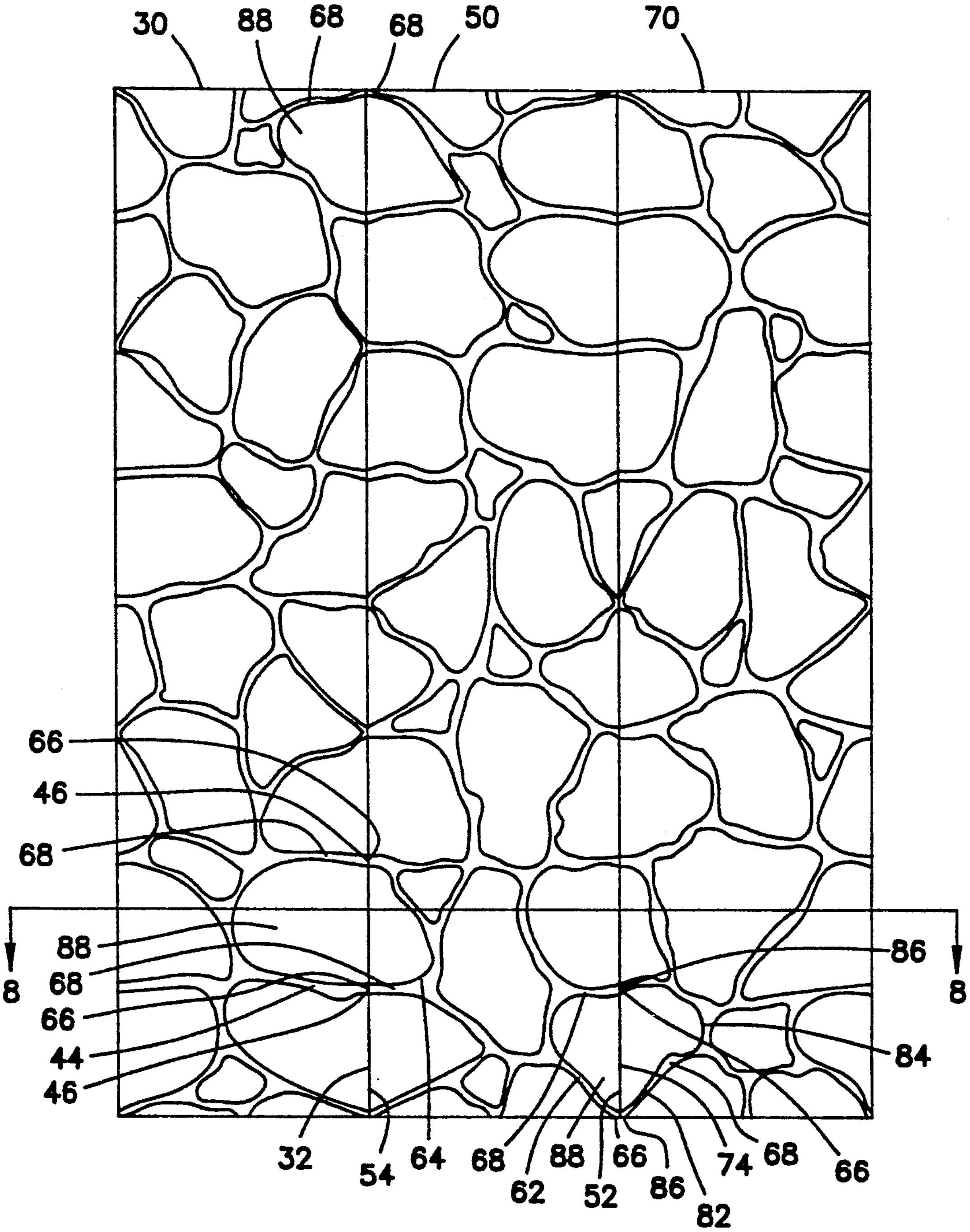
FIG. 6 is a front view of a gang form liner comprised of the form liners shown in FIGS. 1–3.

As shown in FIG. 6, one possible gang form liner 48 is formed from first liner 30, second liner 50, and third liner 70. Mating edge 32 of first liner 30 is in abutting, or mating, relationship with mating edge 54 of second liner 50. Further, mating edge 52 of second liner 50 is in abutting, or mating, relationship with mating edge 74 of third liner 70. The gang form liner 48 is capable of forming three sections of contoured wall simultaneously.

Figure 4:
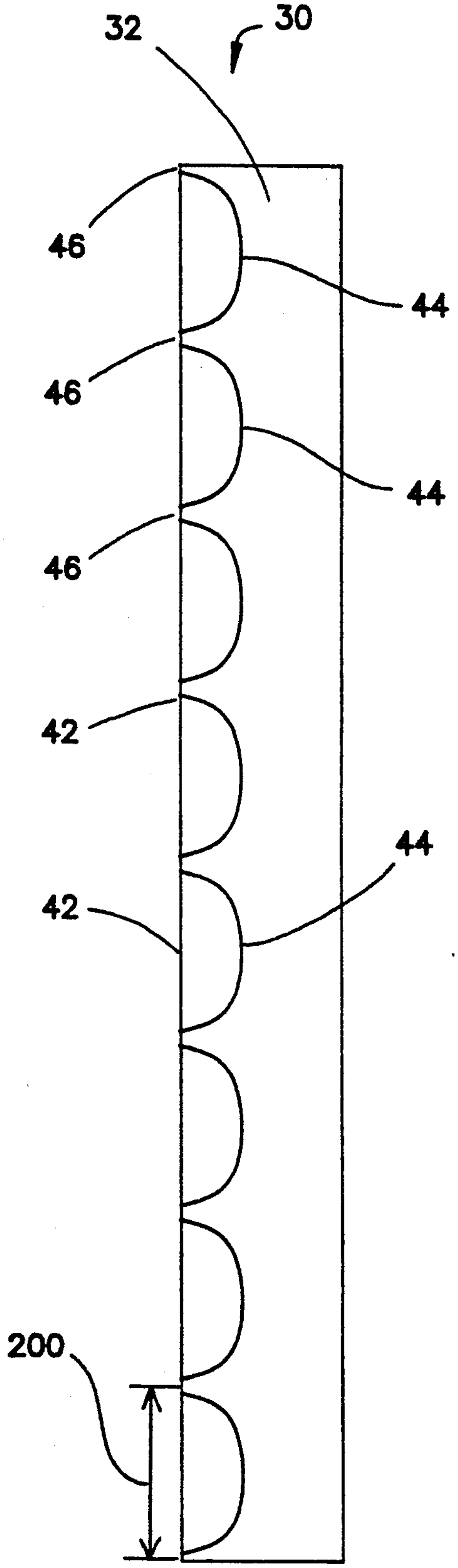
FIG. 4 is a side elevational view of the form liner shown in FIG. 1.
Figure 5:
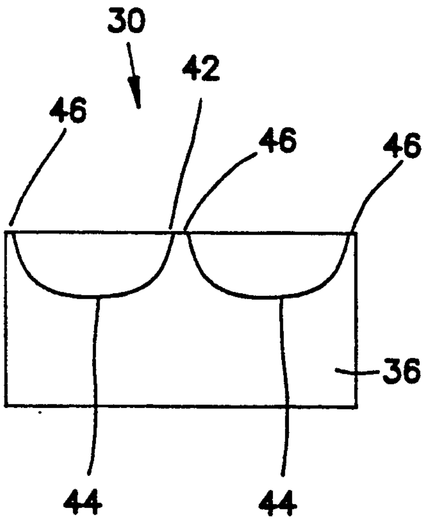
FIG. 5 is a top elevational view of the form liner shown in FIG. 1.

Referring now to FIGS. 1, 4, and 5, the preferred structure of the typical lateral relief mold faces is shown. For illustration purposes only first liner 30 will be discussed. The non-linear, latticework interlocking portion, or interlocking portion 42, intersects the mating edges 32, 34, 36, 38 at a plurality of mating alignment points 46. Preferably, the mating alignment points 46 are equally spaced along the mating edge 31, to allow for maximum versatility in the mating to like liners. Further, in the preferred embodiment, one of the recessed portions 44 is positioned between each adjacent pair of mating alignment points along each of the mating edges 32, 34, 36, 38. It is to be appreciated that more than one recessed portion could be positioned between each mating alignment point.

The interlocking portion 42 surrounds each of the recessed portions 44 along the mating edges 32, 34, 36, 38 such that one half of the contour of a stone is formed by the recessed portions located along each of the mating edges. It is to be noted that the term "one-half" or "half" is intended to include both equal portions and unequal portions that together combine to form a whole stone unit in the contoured wall.

As shown in FIGS. 4 and 5, each of the recessed portions 44 intersect the mating edge 32, 36 in a profile identical to each of the other recessed portions 44. The other mating edges 34, 38 have similar profiles. Because the recessed portions intersect the mating edges in identical profiles along each of the mating edges 32, 34, 36, 38, each of the recessed portions 44 are matable, or combinable, with another recessed portion from an adjacent liner having a similar profile to form a whole stone unit. The result of providing substantially equal profiles along the mating edges is to permit a generally smooth contour to be formed between recessed portions from adjacent form liners placed in mating relationship as is shown in FIG. 6. Second liner 50 and third liner 70 are provided with similar structure along the respective mating edges. As will be discussed below, only a small seam line may be left on the resulting contoured wall caused by the joints between mating form liners.

Referring now to FIG. 6, each of the adjacent pair of mating alignment points 46 along mating edge 32 of first liner 30 connects to, or align with, adjacent pairs of mating alignment points 66 on mating edge 54 of second liner 50. The aligned mating alignment points 46, 66 create an aligned interlocking portion 68. Further, each recessed portion 44 along mating edge 32 of first liner 30 combines with a recessed portion 64 along mating edge 54 of liner 50 to form a combined stone-forming recessed portion 88 such that the combined recess portion 88 is substantially surrounded by the aligned interlocking portion 68. The result of the alignment of the interlocking portions 42, 62 and recessed portions 44, 64 is to create a continuous contoured lateral relief mold face for creating a continuous contoured wall having a stone wall appearance.

This same interaction occurs along mating edge 52 of liner 50 and mating edge 74 of liner 70. Throughout the length of mating edge 32 and mating edge 54 and mating edge 52 and mating edge 74, each of the interlocking portions 62, 82 align at mating alignment points 66, 86 to form aligned interlocking portions 68. Each of the recessed portions 64, 84 align to form combined stone-forming recessed portions 88 to create a continuous contoured lateral relief mold face for creating a continuous contoured wall having a stone wall appearance. This interaction occurs at all of the mating edges in each of the form liners described when the form liners are placed in mating relationship with another form liner.

Figure 7:
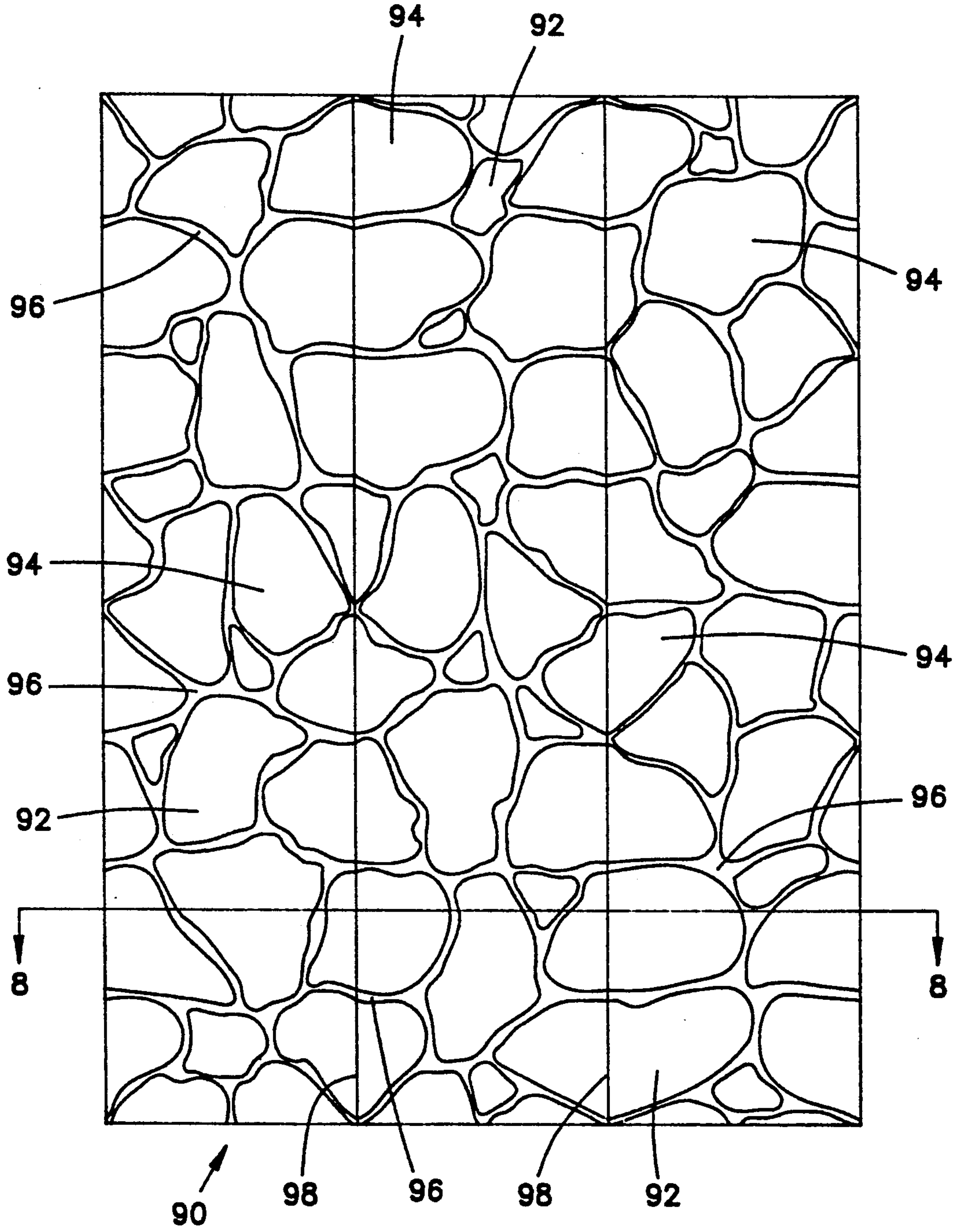
FIG. 7 is a front view of a contoured wall formed using the gang form liner shown in FIG. 6.

The gang form liner of FIG. 6 produces a wall 90 as shown in FIG. 7. The gang form liner 48 has a lateral relief mold face which has a negative relief contour representing the reciprocal image of the pattern and texture of the desired molded wall. The contours of the wall 90 are a reciprocal image of the contours of the lateral relief mold faces 40, 60, 80. As shown in FIG. 7, wall 90 has a contoured face or molded surface 92 formed by a plurality of stone units or portions 94 surrounded by mortar portions 96.

Figure 8:
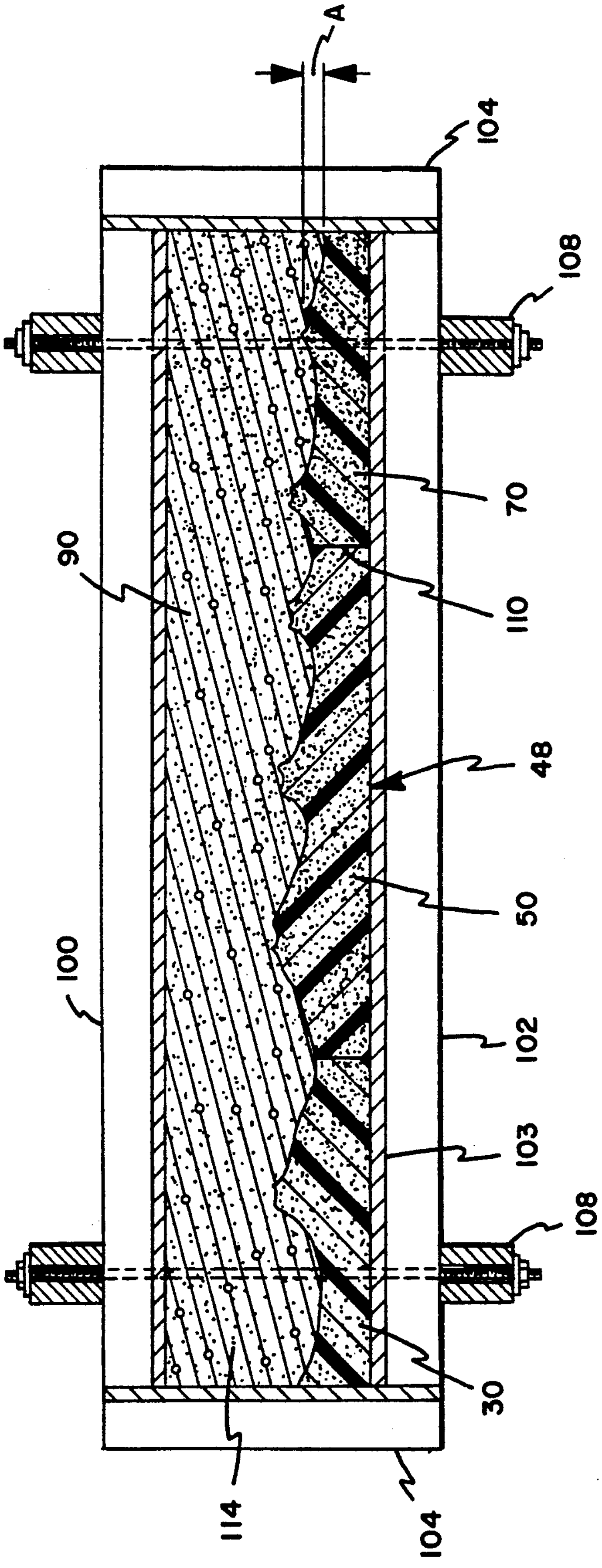
FIG. 8 is a top view in cross section of the gang form liner shown in FIGS. 6 forming the wall shown in FIG. 7 between first and second mold members with end forms.

Referring now to FIG. 8, a method is illustrated for forming the concrete wall 90 using the gang form liner 48. FIG. 8 illustrates forming wall 90 having a first major dimension equal to the major dimension of each of the liners 30, 50, 70. The other major dimension of the section of wall 90 is equal to sum of the minor dimensions of each liner 30, 50, 70. The relief of contoured face 92 of wall 90 varies in profile by a distance designated "A" in FIG. 8. Distance A also represents the depth of the recessed portions relative to the interlocking portions of each form liner. The present invention provides a method by which the profile can vary sufficiently to provide the contour of a naturally appearing stone wall.

In FIG. 8, concrete wall 90 is formed from a hardenable construction material, such as concrete, poured between a first form, or mold member 100, and a second form, or second mold member 102. In the preferred embodiment, second mold member 102 consists of a planar member 103 and the gang form 48 secured to the planar member 103. First mold member 100 consists of a planar member with no form liners attached. First mold member 100 produces a generally smooth surface on wall 90. It is to be appreciated that first mold member 100 could also be provided with a gang form liner to produce a contoured surface on the wall opposite to the contoured surface produced by gang form liner 48.

First mold member 100 and planar member 103 of second mold member 103 may be made of a variety of materials including planar members, for example, plywood, and elongate support members, for example, wood boards and metal bars (not shown). As shown in FIG. 8, individual form liners are attached to planar member 103 to form the second mold member 102. It is to be appreciated that the form liners could be formed integrally with planar member 103.

Each of the form liners 30, 50, 70 are attached to the planar member 103 in mating relationship with each other to form the gang form liner 48. Joints 110 between the liners 30, 50, 70 may produce the seam lines in the molded wall. As shown in FIG. 7, seam lines or part lines 98 are show formed from the joints 110 of mating edges of abutting form liners. In some cases, there may be no seam line or a negligible seam line if there is careful placement of the form liners and/or tight engagement of their mating edges. Any seam lines that are visible may in some cases detract from the natural appearance of the wall. Grinding or sanding of any noticeable seam lines may be necessary to give the wall 90 a more natural appearance. Some grinding and/or filling of surface defects that are common to poured-in-place walls may also be necessary.

To form a wall according to the method shown in FIG. 8, first mold member 100 and second mold member 102 are first positioned generally parallel to each other at a distance equal to the desired thickness of the wall. If the wall is designed so as to not have a uniform thickness, the mold members could be positioned at the appropriate relative angles to achieve this design. The first mold member 100 and the second mold member 102 are then secured at the appropriate distance. End forms 104 are added to both of the ends of the mold members 100, 102 to form a molding cavity 114 for receiving poured hardenable construction material, such as concrete. In FIG. 8, molding cavity 114 is shown after the concrete has been poured to form wall 90.

Ties 108 are employed to maintain the appropriate distance between the first and second mold members 100, 102. Ties 108 could be any of a variety of known structures which function to properly position and affix the mold members. The ties may be threaded rods with nuts (shown in FIG. 8) or "snap-ties" that hold the mold members together until the construction material is hardened and then are snapped off below the outer surface of the wall to remove the mold members.

After the molding cavity 114 is created between the first and second mold members 100, 102 and the end forms 104, concrete, or some other suitable hardenable construction material, is poured into the cavity. The concrete fills the cavity and has an outer surface formed by the first and second mold members 100, 102 and the end forms 104. The concrete is permitted to set, or harden, and the first and second mold members 100, 102 and the end forms 104 are removed. The hardened concrete forms the concrete wall 90 with the molded surface 92 having the contour of a stone wall formed from the lateral relief mold faces 40, 60, 80 of form liners 30, 50, 70.

In the preferred embodiment, the form liners 30, 50, 70 are intended to be reusable. With reusable liners, a single wall can be formed from one or more form liners which are employed to form a section of the wall at a time. For example, the gang form liner 48 could be reused with first and second mold members 100, 102 to form one or more sections of wall in abutting relationship with wall 90. As will be discussed below in greater detail, form liners 30, 50, 70 may be rearranged between pouring operations to vary the stone contour on adjacent sections of the wall formed successively with the mold members 100, 102.

Once the first mold member 100 and the second mold member 102 are removed from the hardened concrete, surface colors, pigments, or stains, such as chemical stains, pigmented sealers, and latex or acrylic paints, may be added to the surface of the concrete to further create the appearance of a natural stone wall. It is to be appreciated that the concrete used to form the walls may be integrally colored with various pigments or coloring agents before pouring the concrete between the mold members. It is anticipated that the concrete chosen to form the wall could be any of a wide variety of known concretes containing cement and aggregates, such as sand and gravel. In particular, type I and type III concrete, which are commonly used in the construction industry, may be used in the present case. Other hardenable construction materials may also be used in the method of the present invention.

The concrete wall 90 is generally planar but could be configured with various curves and/or angles. It is even possible to form right angled corners with appropriately structured form liners. Those skilled in the concrete construction art may recognize that, in some applications, concrete reinforcing materials such as steel rods located in the interior of the wall may be necessary depending upon such considerations as the height of the wall, and the environment in which the wall is to exist. Further, in some applications, the wall may be subject to expansion problems and cracking problems. These considerations may require certain modifications to the wall such as periodically inserting spacers between segments of the wall during the construction process.

The form liners 30, 50, 70 can be made from a variety of materials, including plastic-like materials such as vinyl, silicone rubber, polyurethane, and latex. Further, while FIGS. 1-3 illustrate three embodiments of possible contours for the lateral relief mold faces 40, 60, 80, it is to be appreciated that a wide variety of contours could be provided to vary the pattern and/or texture of the lateral relief mold faces. The lateral relief mold face 60 of second liner 50 and the lateral relief mold face 80 of third form liner 70 are each provided with different patterns to the interlocking portions and recessed portions from the pattern provided in the lateral relief mold face 40 of first liner 30. The form liners may be provided with a wide variety of different textures depending on the type of wall desired. It is to be appreciated that each of the stone-forming recessed portions of each form liner could have a variety of different shapes and textures and, further, the arrangement of the recessed portions could have a variety of different patterns other than the patterns and textures shown.

The contoured relief portions of each of the form liners illustrated in the Figures project from the form liner at varying distances. Typically the profiles may vary between approximately 2.5 centimeters and 25 centimeters. Preferably the profiles vary at least approximately 2.5 centimeters. More preferably, the profiles vary at least about 5 centimeters. See distance "A" in FIG. 8.

One method of manufacturing a form liner 30, 50, 70, of the type adapted to be mounted to a planar member 103 of second mold member 102 includes providing a master mold which has a master relief surface contour that is the contour of the desired concrete wall portion to be molded from the form liner. It has been found that a master relief surface contour consisting of an actual stone wall often provides a natural looking concrete surface. One technique of forming the form liner 30, 50, 70 with the reciprocal surface of the master relief surface pattern is to first create a mold cavity adjacent the master relief surface contour. Next, hardenable molding material is placed into the mold cavity and permitted to set. It has been found that laminating with polyurethane elastomers and foam works well to manufacture a form liner from an actual stone wall. The master mold and form liner are separated leaving a form liner having a reciprocal surface to the master relief surface pattern for attachment to planar member 103. In some cases, planar support members may be added to the interior of the form liner to permit quick and easy attachment of the form liner to the planar member 103.

The form liners 30, 50, 70 of the present invention are designed to be to be used in a manner that helps disguise any repeating pattern to the stone units 94 in the resulting wall when one or more of the liners are reused in separate pouring operations or when two or more identical liners are used in the same gang form liner to form the wall. The form liners are also designed to be versatile in the number of arrangements or orientations possible to reduce costs of construction for some construction applications. FIGS. 9-19 illustrate several arrangements for the form liners that show their versatility and ability to disguise and possibly eliminate repeating patterns to the resulting wall formed with the liners.

Figure 9:
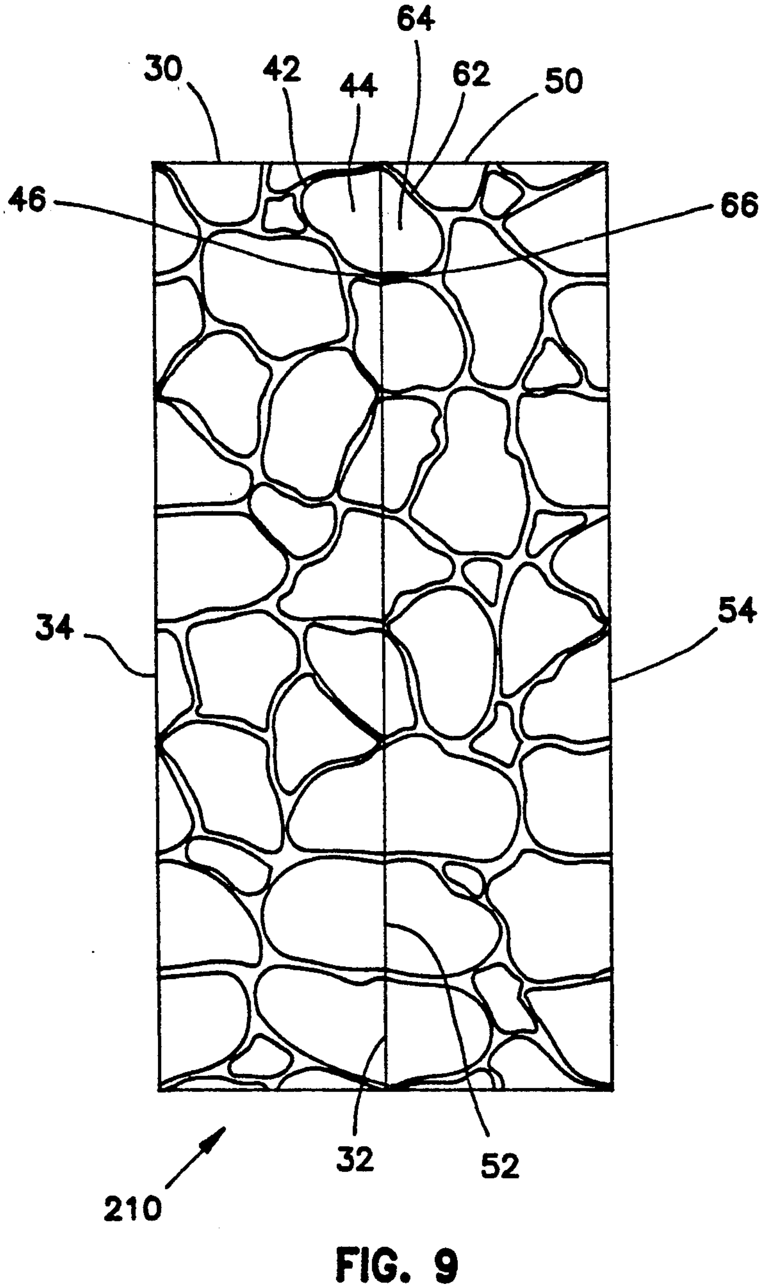
FIG. 9 is a front view of a gang liner comprising the first liner shown in FIG. 1 in mating relationship with the second liner shown in FIG. 2 wherein the second liner is inverted 180° relative to the first liner.

Referring now to FIG. 9, first liner 30 is shown in mating relationship with second liner 50 to form a gang liner 210. Second liner 50 is inverted or rotated 180° relative to its orientation shown in FIG. 2. Mating edge 32 of first liner 30 is in mating relationship with mating edge 52 of liner 50. Along the mating edges 32, 52, interlocking portions 42, 62 connect at mating alignment points 46, 66. Recessed portions 44, 64 along the mating edges 32, 52 combine to form combined stone-forming recessed portions for forming the stone units along the joint between the two liners. Gang liner 210 is useable with first or second mold members 100, 102 and is capable of forming a section of the wall. Gang liner 210 may also be used in combination with other liners to form a larger section of wall.

Figure 10:
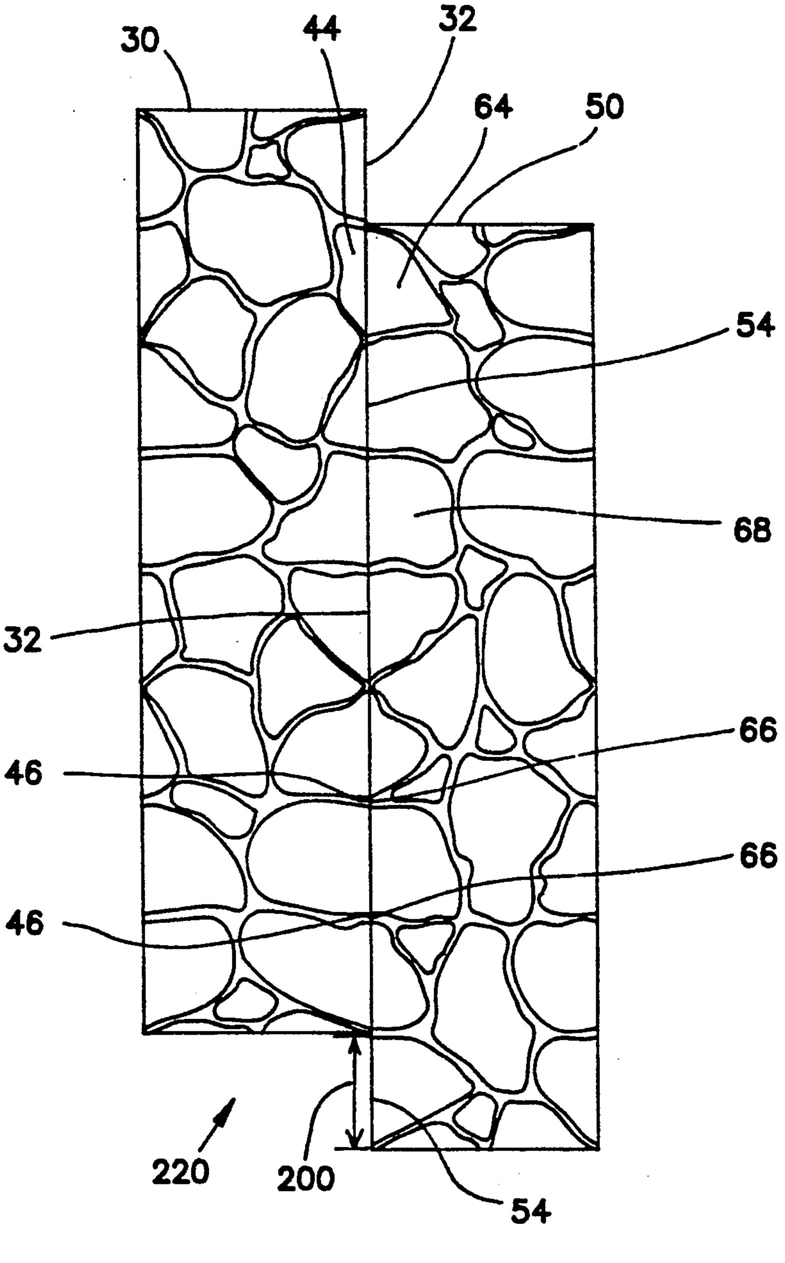
FIG. 10 is a front view of a gang liner comprising the first liner shown in FIG. 1 in mating relationship with the second liner shown in FIG. 2 wherein the second liner is shifted relative to the first liner in a direction along the mating edges.

Referring now to FIG. 10, first liner 30 is shown in mating relationship with second liner 50 to form a gang liner 220. First liner 30 and second liner 50 have the same orientations as shown in FIGS. 1 and 2. However, first liner 30 is offset or shifted relative to second liner 50 along the mating edges 32, 54. As described above, in the preferred embodiment, the mating alignment points 46, 66 of first liner 30 and second liner 50 are equally spaced along the mating edges of the liners. In FIG. 10, second liner 50 is shifted a distance equal to the distance between mating alignment points. This dimension is represented by mating alignment unit 200 noted in the Figures. In the shifted position shown in FIG. 10, each adjacent pair of mating alignment points on the mating edge 32 of first liner 30 connect to, or align with, an adjacent pair of mating alignment points along mating edge 54 of second liner 50. Further, several of the recessed portions 44 between the adjacent pair of mating alignment points 46 along mating edge 32 of liner 30 combine with recessed portions 64 along mating edge 54 of liner 50 to form combined stone-forming recessed portions along the joint between the liners.

The alignment between recessed portions 44, 64 in gang form liner 220 is different than that shown in FIG. 6. The mating alignment points 46 and the mating alignment points 66 and the recessed portions 44 and recessed portions 64 align differently in the arrangement shown in FIG. 10 than the alignment of the arrangement shown in FIG. 6 between first liner 30 and second liner 50. The stone-forming portions formed by the combined recessed portions 44 and 64 along mating edge 32 and mating edge 54 in FIGS. 6 and 10 have different shapes, helping to disguise repeated uses of the same liner or liners.

Figure 11:
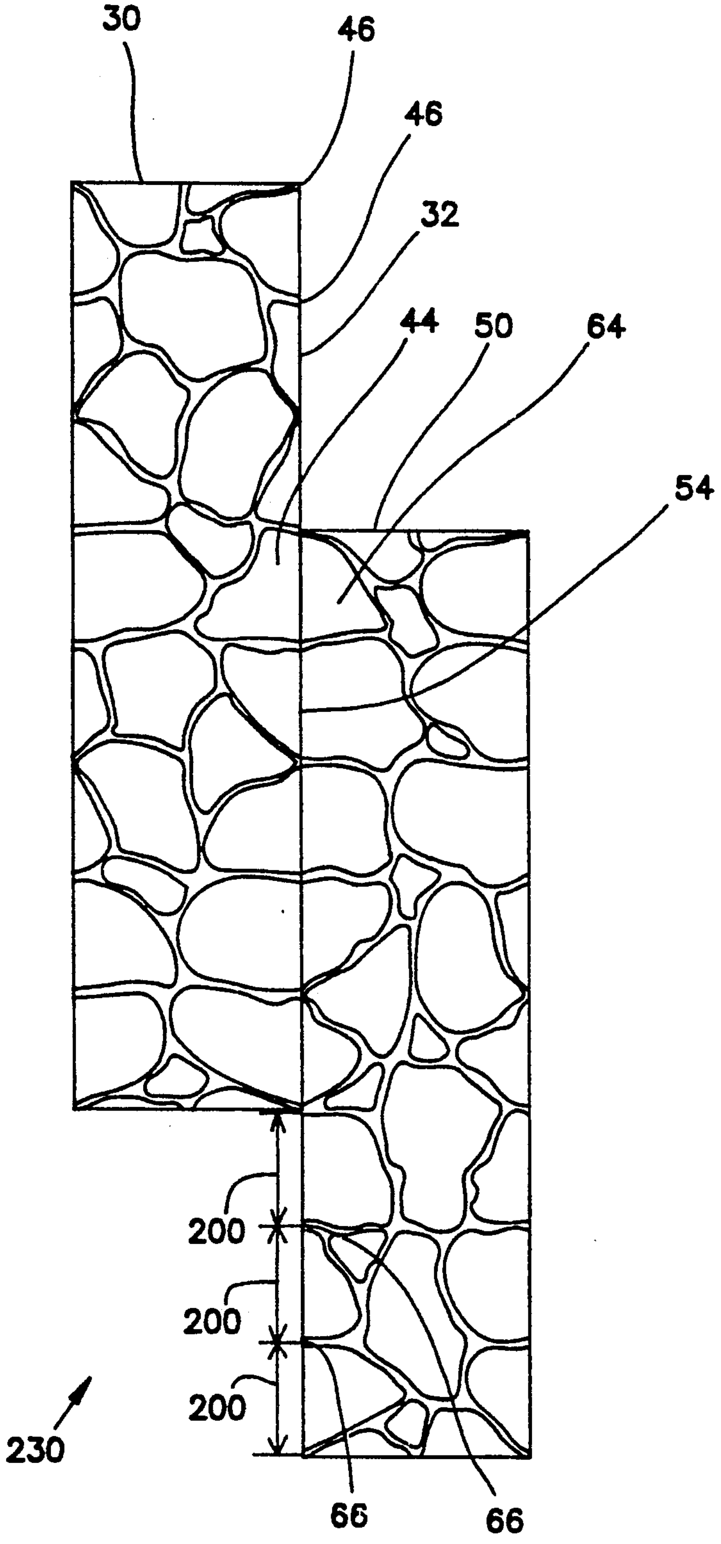
FIG. 11 is a front view of a gang liner comprising the first liner shown in FIG. 1 and a second liner shown in FIG. 2 wherein the second liner is shifted relative to the first liner along the mating edges a distance greater than the liners shown in FIG. 10.

Referring now to FIG. 11, first liner 30 and second liner 50 are shown in mating relationship to form a gang liner 230. The gang form liner 230 of FIG. 11 is similar to the gang form liner 220 of FIG. 10 except that the form liners 30, 50 are shifted a greater distance. In FIG. 11, second liner 50 is offset a distance equal to three times the distance between each intersection point 46, 66 or three mating alignment units 200. As was the case for the liners shown in FIG. 10, the liners shown in FIG. 11 have adjacent pairs of mating alignment points 46, 66 connecting along mating edge 32, 54, and recessed portions 44, 64 combining to form combined recessed portions. The combined recessed portions formed in FIG. 11 have different shapes than those formed in the gang form liners in FIG. 10 and in FIG. 6.

In FIG. 10, second liner 50 is offset from first liner 30 a distance equal to a distance between mating alignment points 46, 66. In FIG. 11, the offset is equal to three times the distance between the mating alignment points 46, 66. It is to be appreciated that second liner 50 can be offset from first liner 30 a distance equal to any of a multiple of the distance between the adjacent pairs of mating alignment points 46, 66 including two, three, four, five, six, and seven times, etc. The only limitation is in the number of mating alignment points present along the mating edges. Depending on the design of liner 30 and liner 50, different multiple offsets may be possible. In the preferred embodiment, liner 30, liner 50, and liner 70 are approximately two feet by eight feet, with a distance between mating alignment points 46, 66, 86 being equal to approximately twelve inches, with a mating alignment unit 200 being equal to about 12 inches.

Figure 12:
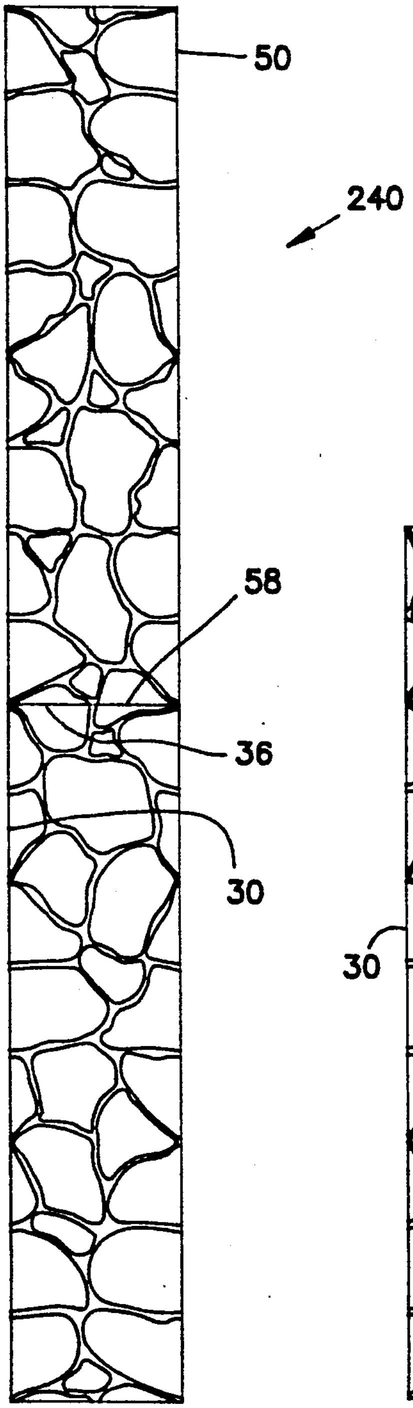
FIG. 12 is a front view of a gang liner comprising the first liner in mating relationship with the second liner along two different mating edges than shown in FIGS. 10 and 11.

Referring now to FIG. 12, first liner 30 and second liner 50 are shown in mating relationship to form a gang form liner 240 wherein mating edge 36 of first liner 30 is in mating engagement with mating edge 58 of second liner 50. As was the case previously, mating alignment points of each liner align to join interlocking portions, and recessed portions along the mating edges combine to form combined recessed portions. The arrangement shown in FIG. 12 is useful to form a vertical wall having a dimension equal to the major dimension of each liner combined.

Figure 13:
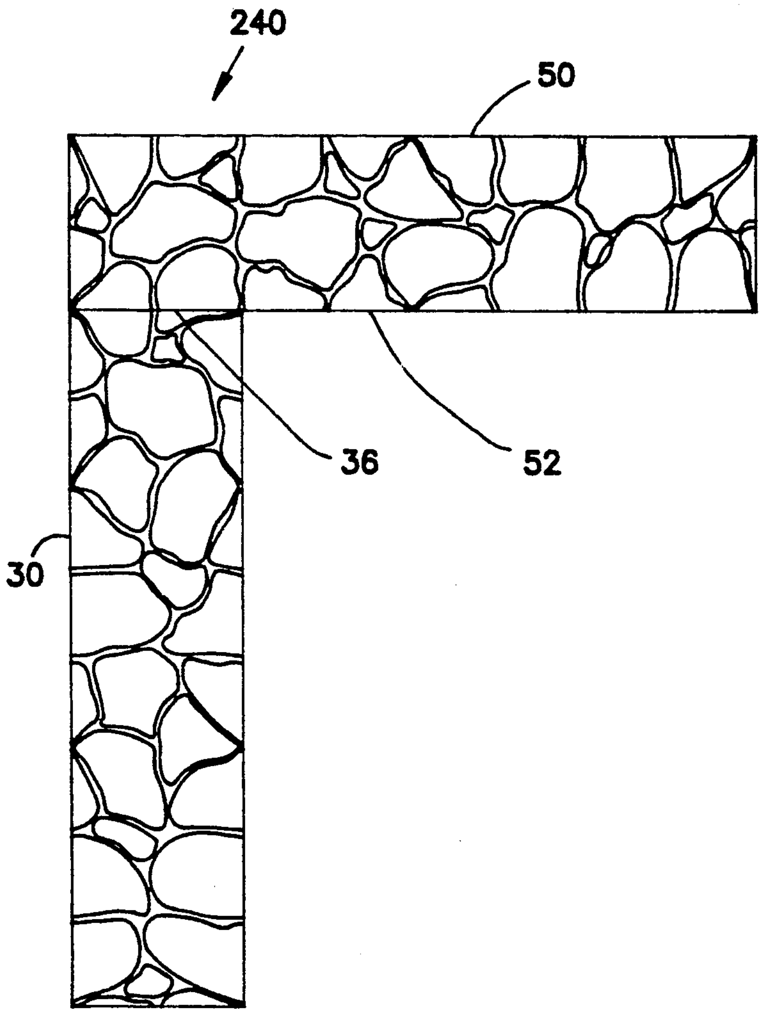
FIG. 13 is a front view of a gang liner comprising the first liner and the second liner in mating relationship showing two different mating edges.

Referring now to FIG. 13, first liner 30 is shown in mating relationship with second liner 50 to form a gang form liner 250 wherein second liner 50 is rotated relative to first liner 30. Mating edge 36 of first liner 30 is in mating relationship with a portion of mating edge 52. Again, mating alignment points align to join interlocking portions, and recessed portions along the mating edges combine to form combined recessed portions.

Figures 14A, 14B, 14C, 14D:
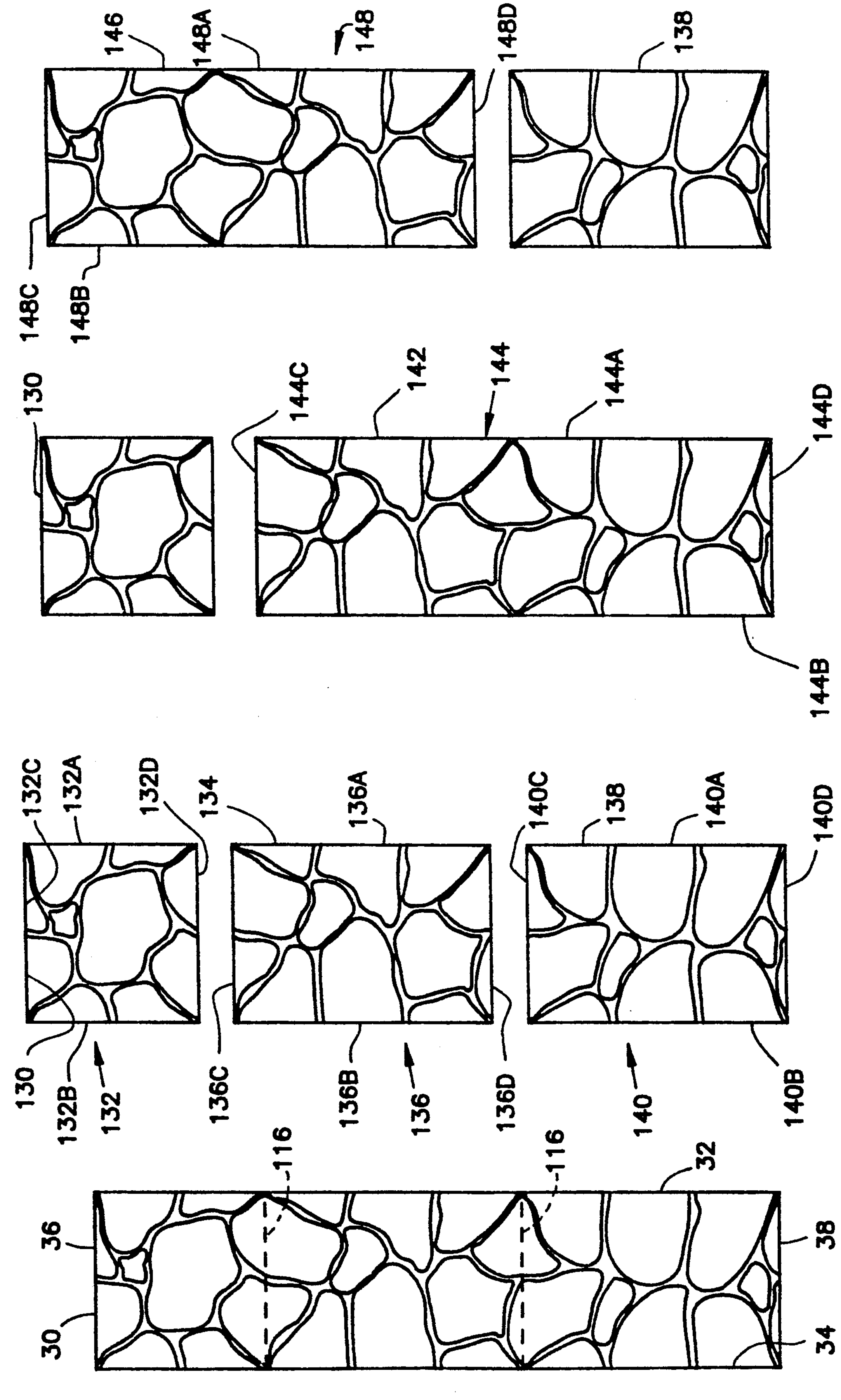
FIG. 14A is a front view of the first liner shown in FIG. 1, with dashed lines representing possible locations on the first liner to separate the first liner into a plurality of smaller individual liners.
FIG. 14B is a front view of the first liner (FIG. 1) separated into three individual liners.
FIG. 14C is a front view of the first liner (FIG. 1) separated into two individual liners.
FIG. 14D is a front view of the first liner (FIG. 1) separated into two individual liners.

FIGS. 14A, 14B, 14C, 14D and FIGS. 15A, 15B illustrate additional qualities of the form liners that make the liners even more versatile in some construction applications, thereby providing cost savings. In FIG. 14A, first liner 30 is shown with dashed lines 116 illustrating possible locations for cuts that can be made to separate first liner 30 into two or more individual liners having various dimensions less than the dimensions of first liner 30. In FIG. 14B, first liner 30 has been separated into three individual liners 130, 134, 138. In FIG. 14C, first liner 30 has been separated into two liners, 130, 142. In FIG. 14D, liner 30 has been separated into two liners, 146, 138. In this manner, various smaller liners can be formed with dimensions of, for example, two feet by two feet, two feet by three feet, two feet by five feet, and two feet by six feet.

Liner 130 has a mating edge 132 comprising a plurality of mating edges 132A, 132B, 132C, 132D with similar structure and profiles to the liners 30, 50, 70 described previously. Liner 134 has a mating edge 136 comprising plurality of mating edges 136A, 136B, 136C, 136D with similar structure and profiles to the liners 30, 50, 70 described previously. Liner 138 has a mating edge 140 comprising a plurality of mating edges 140A, 140B, 140C, 140D. Liner 142 has a mating edge 144 comprising a plurality of mating edges 144A, 144B, 144C, 144D. Liner 146 has a mating edge 148 comprising a plurality of mating edges 148A, 148B, 148C, 148D.

Figure 15A:
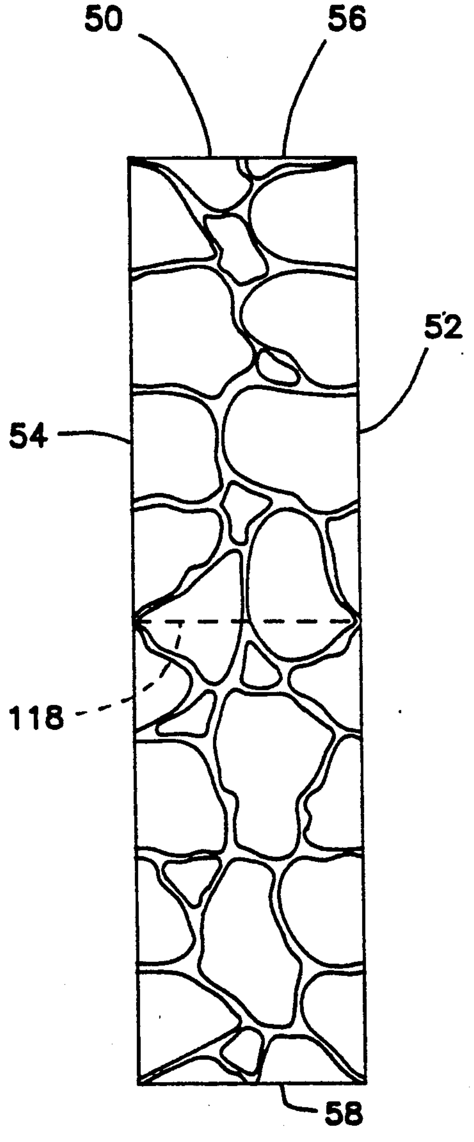
FIG. 15A is a front view of the second liner shown in FIG. 2 with a dashed line representing a possible location to separate the second liner into a plurality of smaller individual liners.
Figure 15B:
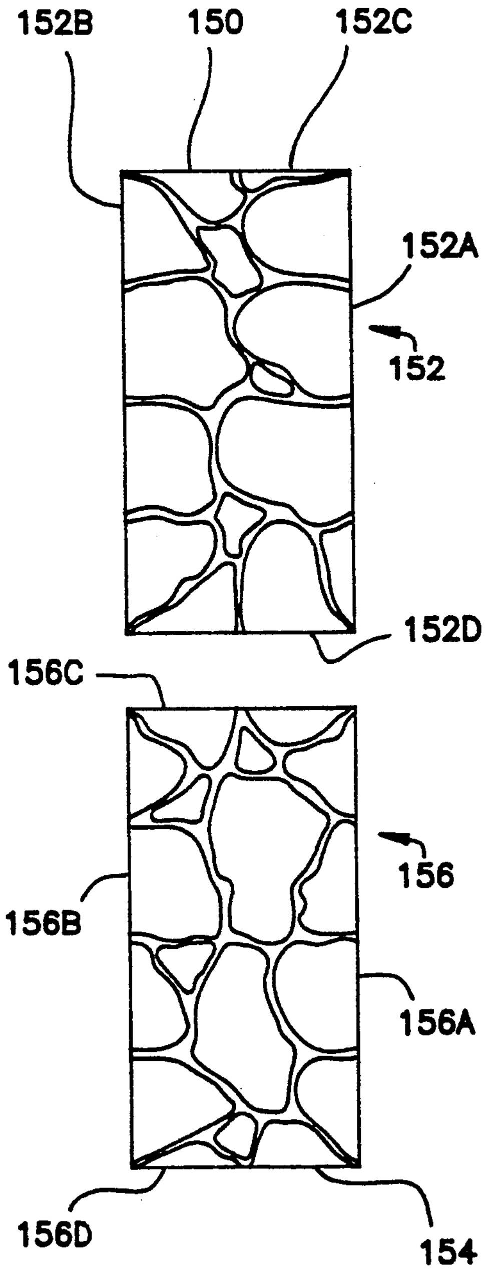
FIG. 15B is a front view of the second liner separated into two different individual liners.

As shown in FIG. 15A, second liner 50 is shown with a dashed line 118 indicating another possible location to separate the second liner into smaller individual liners having smaller dimensions. In FIG. 15B, second liner 50 has been separated into liner 150, and liner 154. In this manner, two liners having dimensions of two feet by four feet have been formed. Liner 150 has a mating edge 152 comprising a plurality of mating edges 152A, 152B, 152C, 152D. Liner 154 has a mating edge 156 comprising a plurality of mating edges 156A, 156B, 156C, 156D.

These smaller liners shown in FIGS. 14B–C and 15B are useful in forming walls of a smaller height than the liners they were formed from. They are also useful for filling gaps left when liners 30, 50, 70 have been shifted or rotated in particular arrangements.

Figure 16:
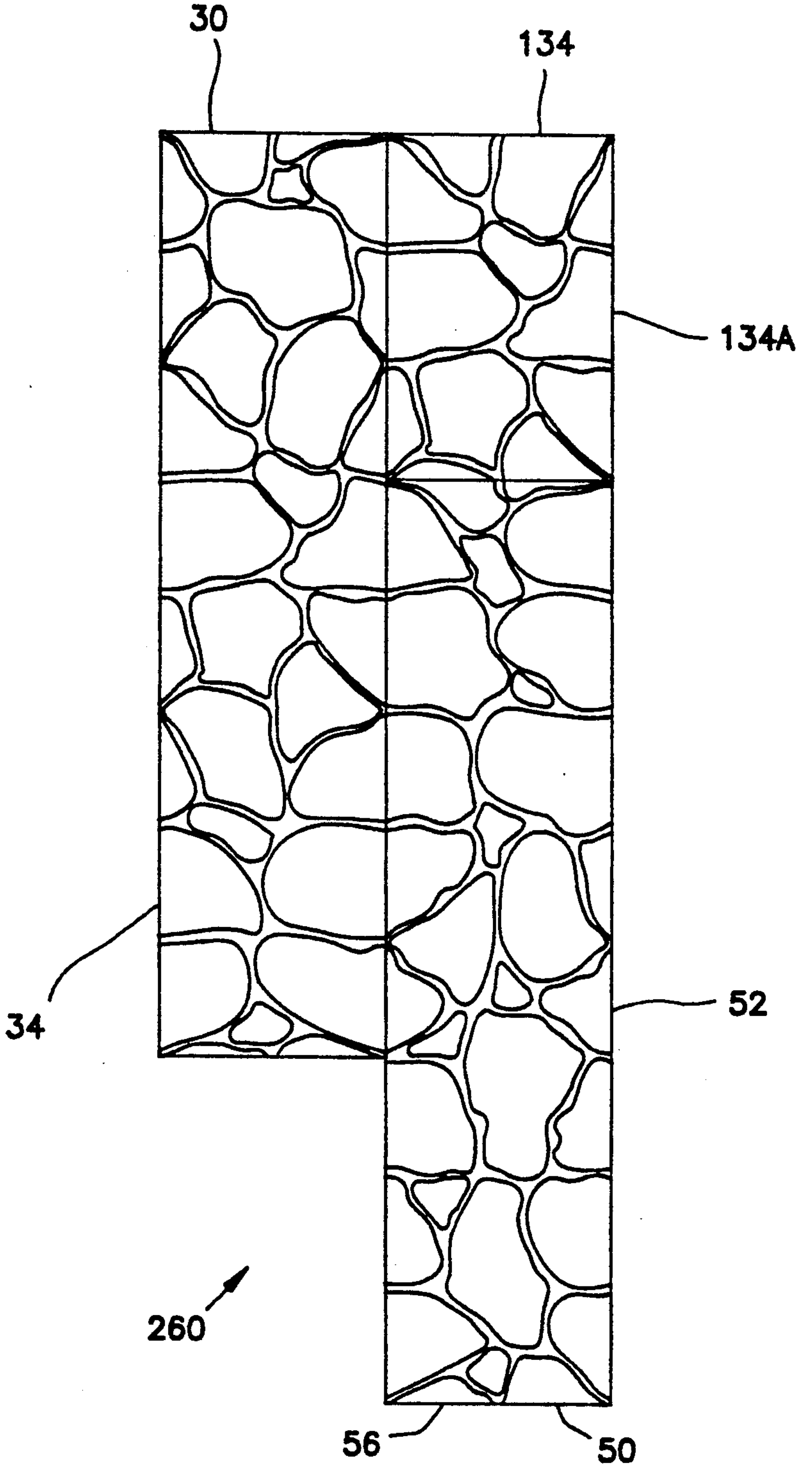
FIG. 16 is a front view of a gang liner comprising the first liner in mating relationship with the second liner wherein the second liner is shifted relative to the first liner as shown in FIG. 11, with one of the individual liners from FIG. 14B added to the area vacated by the shifting operation.

In FIG. 16, a gang form liner 260 has been formed with first liner 30 and second line 50 wherein second liner 50 has been shifted to create the arrangement illustrated in FIG. 11. When second liner 50 was shifted relative to first liner 30, a gap or space was left. From liner 134 fits into the gap left behind. In this manner, a wall with a uniform top surface is created. As noted above, form liner 134 can be formed by separating the second of two first liners 30 provided, with the first liner 30 used to mate with second liner 50.

Figure 17:
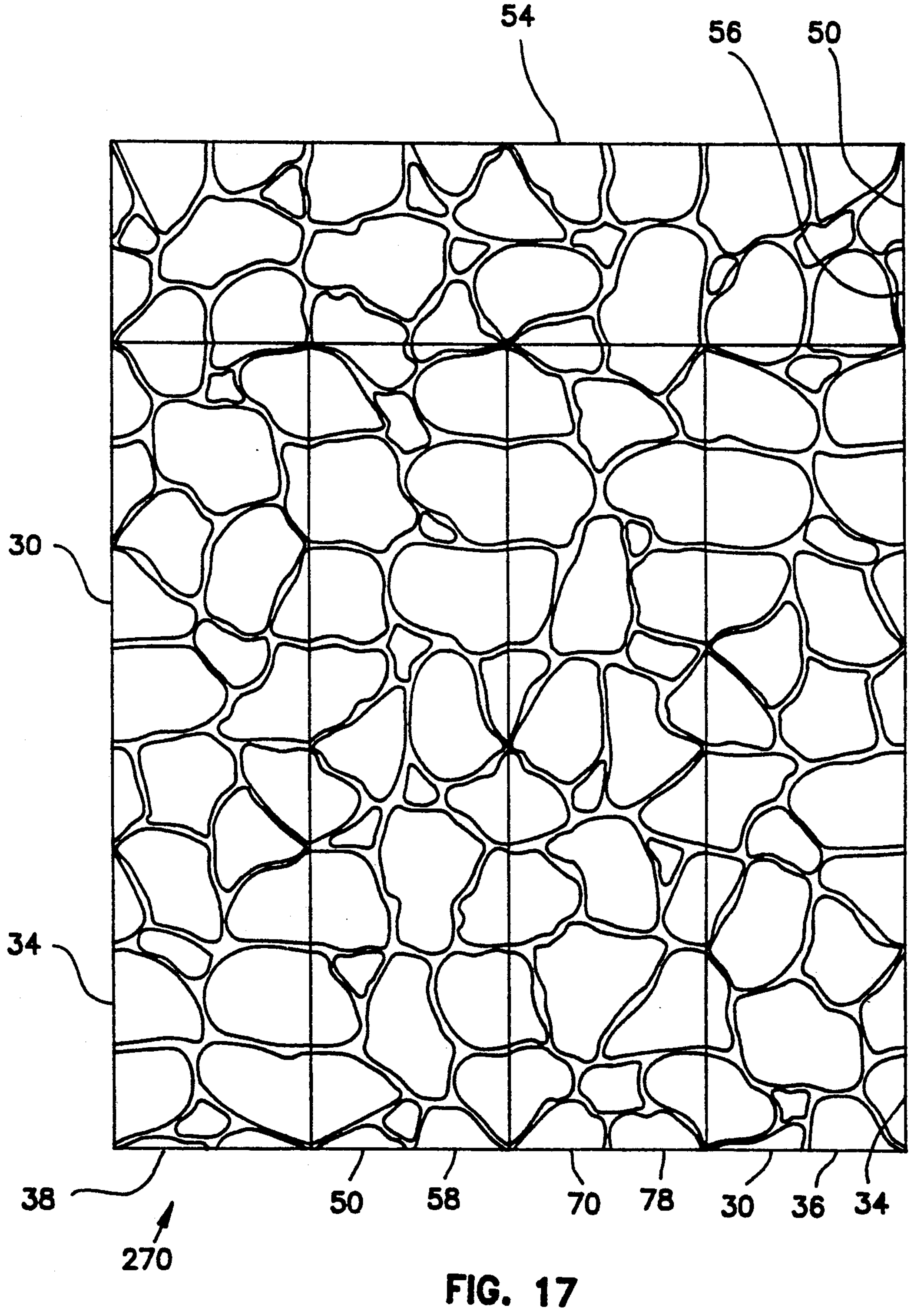
FIG. 17 is a front view of a gang form liner formed from two of the first liners, two of the second liners, and one of the third liners, wherein the gang form liner is capable of forming a wall of greater dimension than any of the individual form liners.

Referring now to FIG. 17, a gang form liner 270 is formed with three different types of liners, first liner 30, second liner 50 and third liner 70. The resulting wall will have a height greater than the height of any of the individual liners. Further, a non-repeating pattern will be also provided in the section of wall formed by the gang form liner 270. In FIG. 17, first liner 30, second liner 50 and third liner 70 are placed in mating relationship as was shown in FIG. 6. A second first liner 30 is provided and inverted before placing in mating relationship with third liner 70. A second liner 50 is provided and rotated relative to the remaining liners and placed in mating relationship along the top of each liner.

The resulting wall formed from the gang form liner 270 will have a stone pattern that more naturally resembles a stone wall since any repeating pattern is disguised through inversion and rotation of the liners. Furthermore, the height of the liners was extended by placing a fifth liner across the top of the four parallel liners. This further illustrates the high degree of versatility of the liner system of the instant invention, and the cost savings realized by allowing walls of differing heights to be built with the same set of liners.

Figure 18:
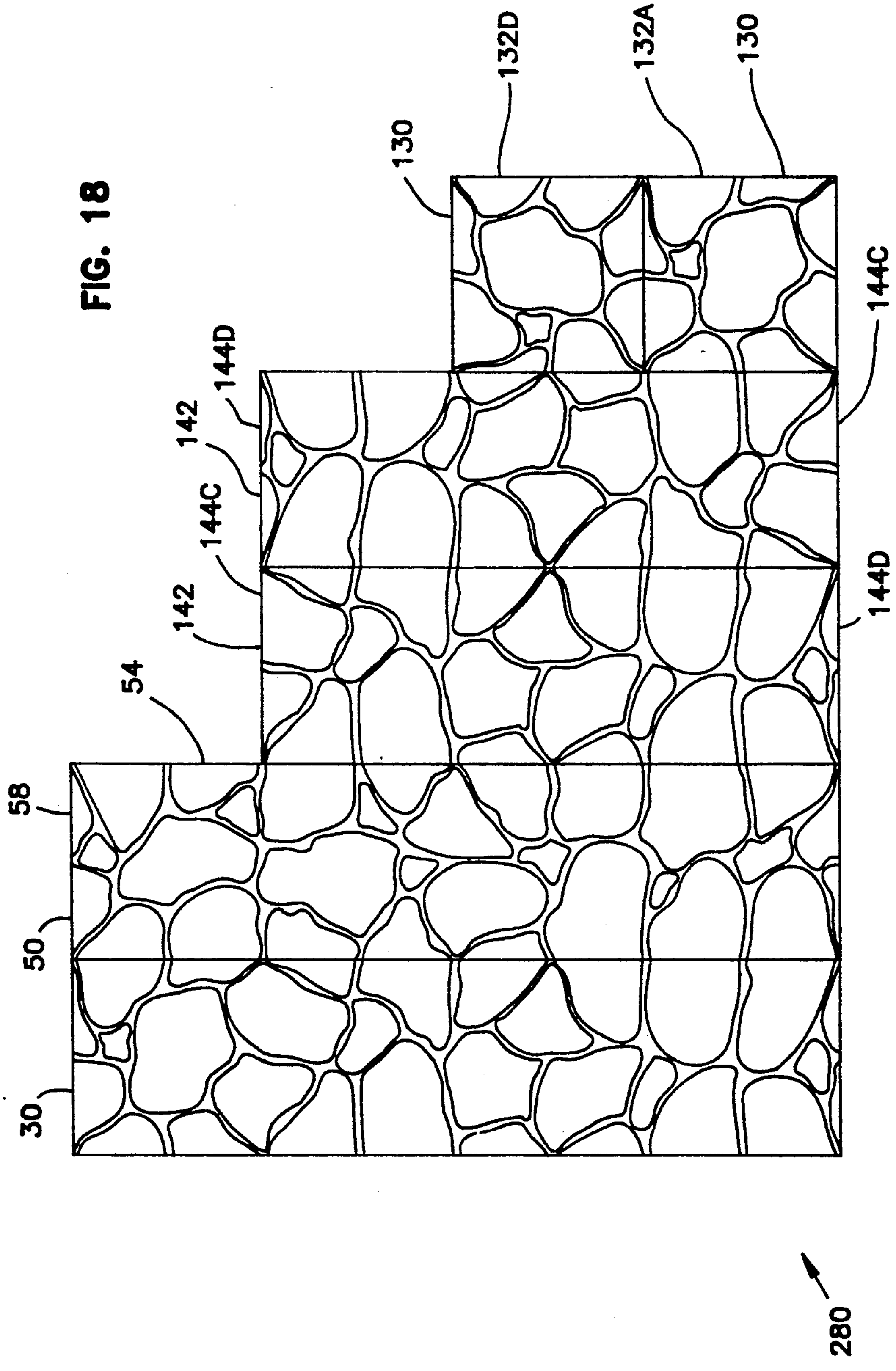
FIG. 18 is a front view of another gang form liner capable of forming a wall of varying heights.

Referring now to FIG. 18, a gang form liner 280 for use in forming a wall having varying height, in this case a step-down height, is shown. The gang form liner 280 is formed from two different types of liners. The resulting gang form liner has a stone pattern that resembles a natural stone wall since any repeating pattern is disguised. In FIG. 18, a first liner 30 is placed in mating relationship with an inverted second liner 50. Two smaller liners 142, are placed in mating relationship, with the second liner 142 inverted relative to the first. Two smaller liners 130 are also placed in mating relationship with one inverted relative to the other.

FIG. 18 illustrates additional ways the present invention may reduce construction costs for some construction applications. The gang form liner 280 can be formed from four liners, all with the same dimensions. Further, only two different patterns to the four liners need to be provided. In FIG. 18, three of four liners would have the same pattern. Two of those can be cut to form the four smaller liners 130, 142. Since only two different patterns to the four liners were provided, manufacturing costs of the liners would be less. Further, the dimensions of the gang form liner were reduced in step down fashion by separating two of the liners into smaller liners and arranging the liners in the manner shown. Because of this, five liners, each with a dimension equal to the height of the desired wall, did not have to be manufactured at the factory for this particular application. Instead, the liners making up the gang form liner 280 could be cut on-site from standard length liners.

Figure 19:
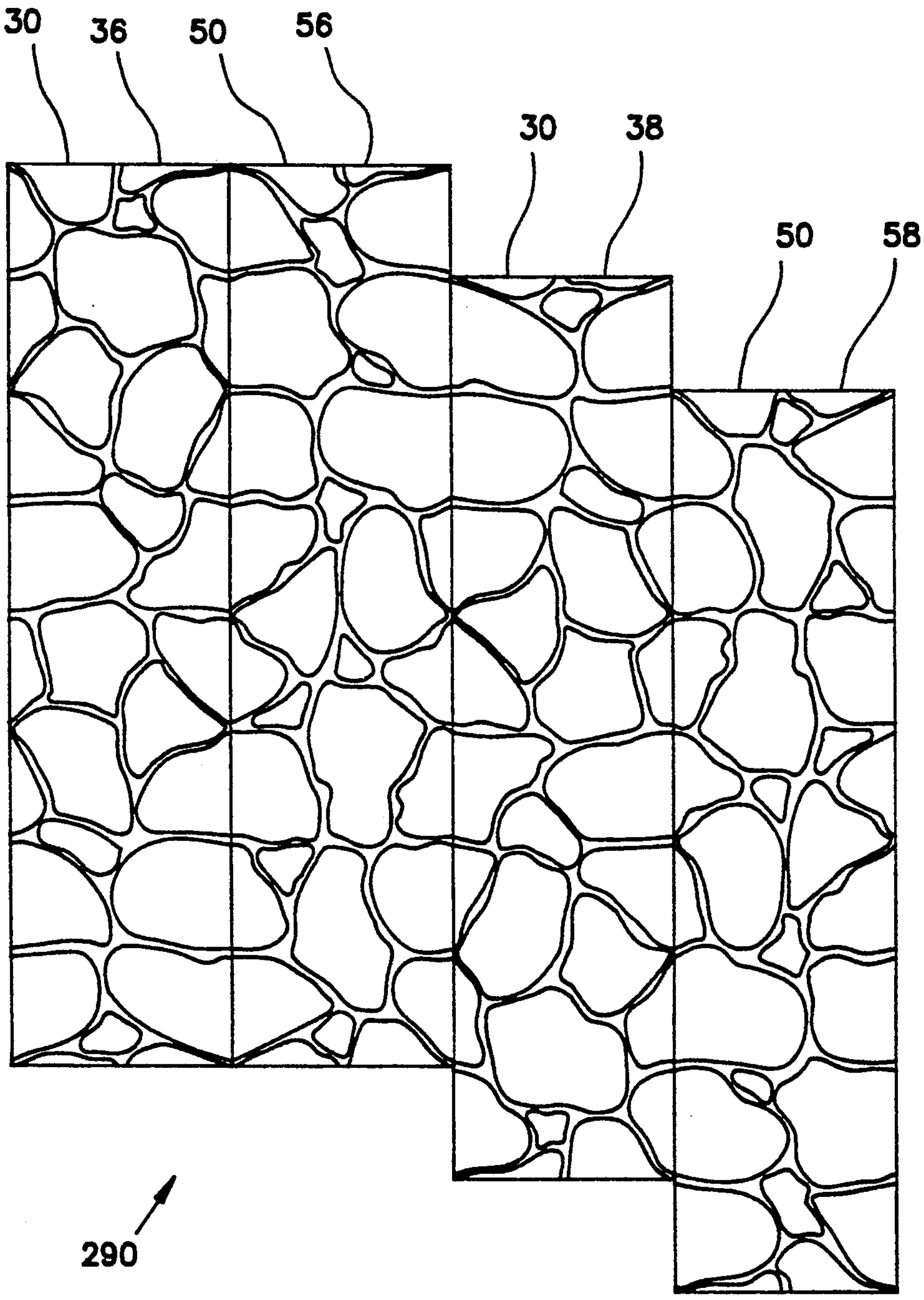
FIG. 19 is a front view of another gang form liner capable of forming a wall following a contour of the ground.

Referring now to FIG. 19, a gang form liner 290 is shown for producing a wall having a step-down top surface and a base which also steps down. The resulting wall may be used to follow the contours of the ground with varying elevation. The gang form shown 290 in FIG. 19 is formed from two different types of liners, two first liners 30 and two second liners 50. One first liner 30 is placed in mating relationship with one of the second liners 50. The second first liner 30 is inverted and shifted relative to the first second liner 50. The second liner 50 is inverted and shifted relative to the inverted second first liner 30. Again, construction costs may be reduced in some construction applications since only two different types of liners were provided and yet no repeating pattern is easily visible.

Figure 20:
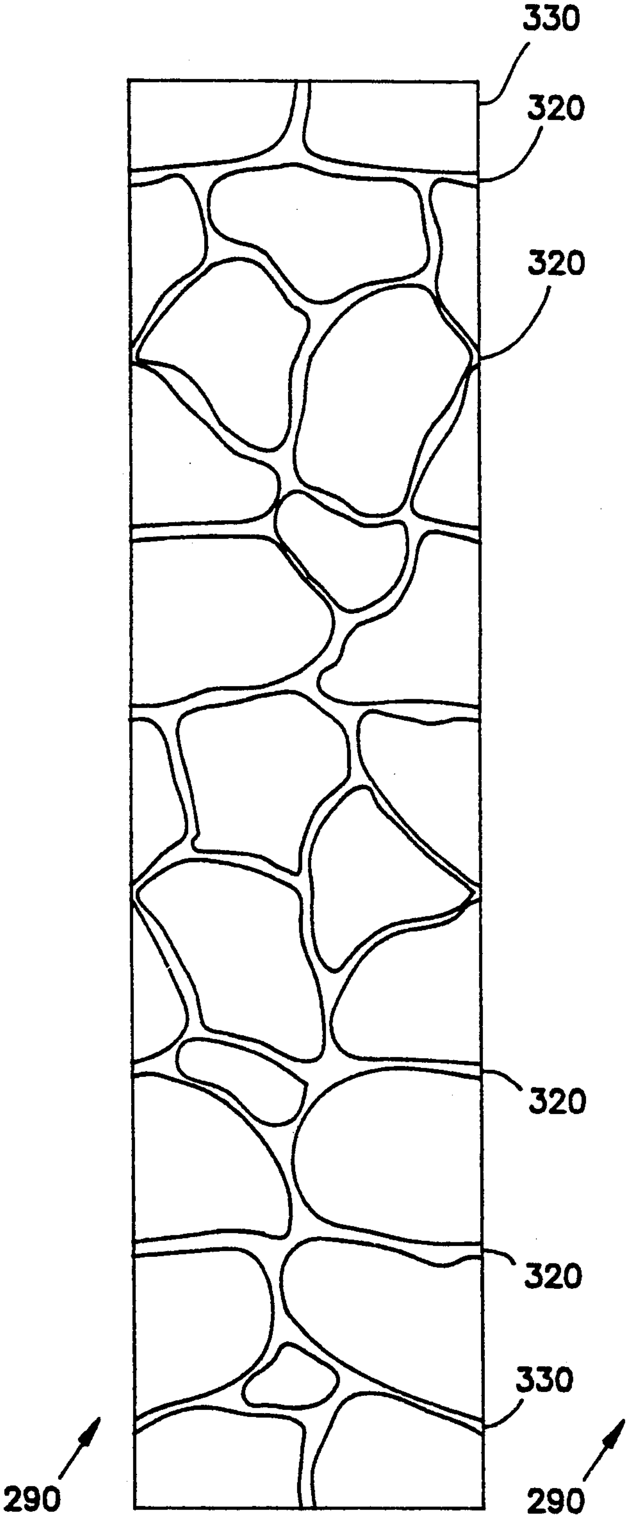
FIG. 20 is a front view of a fourth embodiment of a form liner wherein a recessed portion is present in the corner of each liner.
Figure 21:
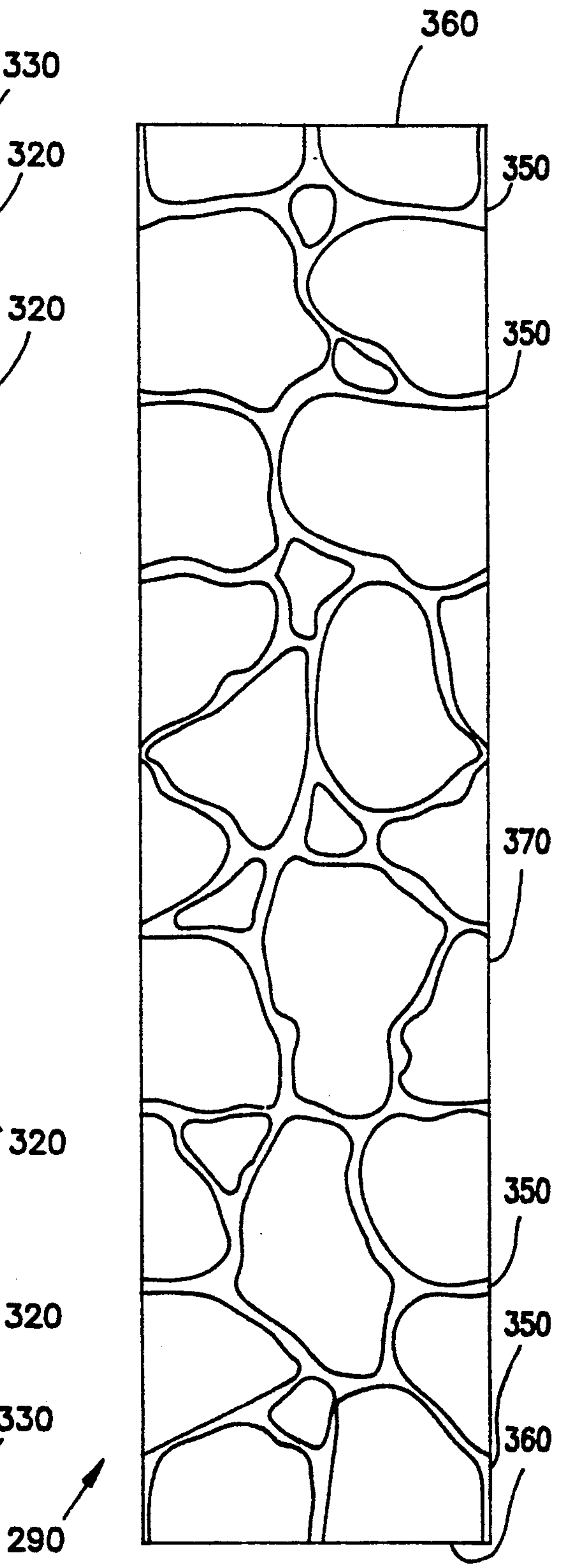
FIG. 21 is a front view of a fifth embodiment of a form liner similar to the form liner shown in FIG. 20, wherein an interlocking portion is present along the major dimension of the liner adjacent the corner recessed portions.

Referring now to FIGS. 20 and 21, alternative embodiments of form liners are shown. In FIG. 20, a fourth liner 310 is shown. Liner 310 is different from first liner 30, second liner 50 and third liner 70 in that the mating alignment points 320 on each end 330 are offset from the end 330 a distance equal to half the distance between adjacent pair of mating alignment points. Referring now to FIG. 21, a fifth embodiment of a form liner 340 is shown. Like the mating alignment points 320 in fourth liner 310, mating alignment points 350 are also offset from the ends 360 a distance equal to half the distance between adjacent pair of mating alignment points. However, in the fifth liner 340, a recessed portion is not located along the mating edges 370 between the corner and the first intersection point in a direction along the major dimension of liner.

It is to be appreciated that a wide variety of different arrangements, other than those illustrated in the Figures provided herein, are possible from the teachings of the present invention, to produce a wide variety of gang form liners and resulting walls. As the number of different liners provided in the particular construction application increases, the number of possible arrangements increases. Through the use of only a small number of liners a nearly infinite number of combinations are possible. As noted above, substantial construction cost savings can be realized, as the form liners of the present invention can be easily varied in arrangements to accommodate changes in required height of the desired wall, or changes in ground contour. Thus, a construction firm can successfully address the requirements of each individual project with only a small number of liners and liner segments.

Using the principles of the present invention, a contoured wall can be formed from a plurality of form liners which are arranged in a manner to give the appearance of a random and natural looking stone wall. As noted previously , in many construction applications a plurality of reusable liners may be made available to form a plurality of sections of a continuous wall successively. The natural looking appearance of the stone wall is not sacrificed in the present case because the form liners of the present invention are easily variable in arrangement to change the pattern of the stone units produced in the resulting wall. The resulting wall is provided with a stone contour, in which the pattern is not easily visible, if at all.

It is to be understood, that even though numerous characteristics and advantages of the invention have been set forth in the foregoing description, together with details of the structure and function of the invention, the disclosure is illustrative only, and changes may be made in detail, especially in matters of size, shape, and arrangement of the parts, wherein the principles of the invention to the full extent indicates by the broad general meaning of the terms in which the appended claims are expressed.

What is claimed is:

1. A method of forming a wall having a natural stone wall contour comprising:

(a) providing a first form liner and a second form liner, each form liner having:

(i) a lateral relief mold face including:

(A) a plurality of recessed portions, each recessed portion adapted to form a stone region having a three-dimensional contour of a portion of a natural stone; and (B) a latticework interlocking portion defining a non-uniform pattern, adapted to form a mortar region that lies between said stone regions, said interlocking portion surrounding at least a portion of a perimeter of each of said recessed portions; and (ii) a mating edge along a perimeter of said lateral relief mold face, said interlocking portion intersecting said mating edge at a plurality of mating alignment points, said mating alignment points being spaced equidistant along said mating edge, a distance between any two adjacent mating alignment points equal to a mating alignment unit, said mating edge of each of said form liners adapted to mate with another form liner along said mating edge in a plurality of mating configurations;

(b) mating said first and second form liners in a first arrangement along at least a portion of said mating edges to form a first gang form liner, wherein at least two of said mating alignment points of said first form liner are aligned with at least two of said mating alignment points of said second form liner, and wherein at least one of said recessed portions between said aligned mating alignment points of said first form liners is aligned with at least one of said recessed portions between said aligned mating alignment points of said second form liner to form at least one continuous stone-forming recessed portion;

(c) providing a mold member;

(d) securing said first gang form liner adjacent to said mold member to create a molding cavity between said first gang form liner and said mold member wherein said lateral relief mold face of each form liner faces toward a portion of said mold member and wherein said first gang form liner and said mold member are spaced at a distance equal to a desired thickness of said wall to be formed;

(e) filling said molding cavity with a hardenable construction material; and (f) allowing said hardenable construction material to set to provide said wall with at least one lateral face having said contour of said stone wall molded from said lateral relief mold faces of said first and second form liners of said first gang form liner.

2. The method of claim 1, wherein said interlocking portion of at least one of said form liners completely surrounds at least two of said recessed portions of said at least one form liner to define different shaped perimeters to said recessed portions of said at least one form liner.

3. The method of claim 1, wherein said latticework interlocking portion of said lateral relief mold face of each form liner includes at least one non-linear segment.

4. The method of claim 1, wherein said mating edge of said first liner and said mating edge of said second liner are rectangular and each mating edge comprises a pair of lateral edge portions and a pair of end edge portions.

5. The method of claim 4, wherein one of said pair of lateral edge portions of said first liner is mated with one of said pair of lateral edge portions of said second liner to form said first gang form liner.

6. The method of claim 4, wherein said lateral edge portions of said first and second form liners have equal lengths, and one of said pair of lateral edge portions of said first liner is mated with one of said pair of lateral edge portions of said second liner to form said first gang form liner such that said lateral edge portions of said first and second form liners are offset a distance equal to a multiple of said mating alignment unit.

7. The method of claim 4, wherein one of said pair of end edge portions of said first liner is mated with one of said pair of lateral edge portions of said second liner.

8. The method of claim 4, wherein one of said pair of end edge portions of said first liner is mated with one of said pair of end edge portions of said second liner.

9. The method of claim 1, further comprising the steps of:

(a) providing a third form liner matable with at least one of said mating edges of said first and second form liners; and (b) mating said third form liner with said mating edge of at least one of said first and second form liners before performing step (e) of claim 5.

10. The method of claim 1, further comprising the steps of:

(a) rearranging said first and second form liners after forming said wall and mating said first and second form liners in a second arrangement to form a second gang form liner having a different pattern of alignment to said first gang form liner used to form said wall; and (b) repeating steps (c) through (g) of claim 1 with said second gang form liner to form a second wall.

11. The method of claim 10, wherein said mating edge of said first liner and said mating edge of said second liner are rectangular and each mating edge comprises a pair of lateral edge portions and a pair of end edge portions.

12. The method of claim 11, wherein one of said pair of lateral edge portions of said first liner is mated with one of said pair of lateral edge portions of said second liner to form said first gang form liner, and said second gang form liner is formed by sliding one or both of said first and second form liners along said mated lateral edge portions of said first liner and said second liner a distance equal to a multiple of said mating alignment unit.

13. The method of claim 11, wherein one of said pair of lateral edge portions of said first liner is mated with one of said pair of lateral edge portions of said second liner to form said first gang form liner, and said second gang form liner is formed by mating one of said pair of end edge portions of said first liner with one of said pair of lateral edge portions of said second liner.

14. The method of claim 11, wherein a first of said lateral edge portions of said first liner is mated with a first of said lateral edge portions of said second liner to form said first gang form liner, and said second gang form liner is formed by mating said first lateral edge portion of said first liner with a second of said lateral edge portions of said second liner.

15. The method of claim 11, wherein a first of said lateral edge portions of said first liner is mated with a first of said lateral edge portions of said second liner to form said first gang form liner, and said second gang form liner is formed by mating a second of said lateral edge portions of said first liner with a second of said lateral edge portions of said second liner.

16. The method of claim 11, wherein one of said pair of lateral edge portions of said first liner is mated with one of said pair of lateral edge portions of said second liner to form said first gang form liner, and said second gang form liner is formed by mating one of said pair of end edge portions of said first liner with one of said pair of end edge portions of said second liner.

* * * * *

UNITED STATES PATENT AND TRADEMARK OFFICE
CERTIFICATE OF CORRECTION

PATENT NO. : 5,225,134

DATED : July 6, 1993

INVENTOR(S) : Nasvik et al.

It is certified that error appears in the above-identified patent and that said Letters Patent is hereby corrected as shown below:

Column 1, line 33, DELETE "one" and INSERT --on--. (first occurrence)

Column 4, line 13, DELETE "Figs." and INSERT --Fig.--

Column 7, line 13, DELETE "connects" and INSERT --connect--.

Column 8, line 10, DELETE "103" and INSERT --102--.

Column 8, line 23, DELETE "show" and INSERT --shown--.

Column 12, line 54, DELETE "From" and INSERT --Form--.

Claim 1, column 15, line 17, DELETE "liners" and INSERT --liner--.

Signed and Sealed this

Fourth Day of October, 1994

Attest:

Bruce Lehman

BRUCE LEHMAN

*Attesting Officer* *Commissioner of Patents and Trademarks*